(12) United States Patent
Yan et al.

(10) Patent No.: US 12,513,200 B2
(45) Date of Patent: Dec. 30, 2025

(54) NETWORK API CAPABILITY REPORTING METHOD, APPARATUS, AND SYSTEM

(71) Applicant: Huawei Technologies Co., Ltd., Shenzhen (CN)

(72) Inventors: Yali Yan, Shanghai (CN); Qianghua Zhu, Beijing (CN); Xiaoyun Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 717 days.

(21) Appl. No.: 17/707,232

(22) Filed: Mar. 29, 2022

(65) Prior Publication Data

US 2022/0225149 A1    Jul. 14, 2022

Related U.S. Application Data

(63) Continuation of application No. PCT/CN2020/118092, filed on Sep. 27, 2020.

(30) Foreign Application Priority Data

Sep. 29, 2019    (CN) .................... 201910936851.X

(51) Int. Cl.
*H04L 65/1083* (2022.01)
*G06F 9/54* (2006.01)
(Continued)

(52) U.S. Cl.
CPC .......... *H04L 65/1063* (2013.01); *G06F 9/547* (2013.01); *H04L 65/611* (2022.05);
(Continued)

(58) Field of Classification Search
None
See application file for complete search history.

(56) References Cited

U.S. PATENT DOCUMENTS

2008/0222238 A1    9/2008    Ivanov et al.
2016/0164945 A1    6/2016    Ding et al.
(Continued)

FOREIGN PATENT DOCUMENTS

CN         1878083 A       12/2006
CN       102938763 A        2/2013
(Continued)

OTHER PUBLICATIONS

3GPP TS 29.522 V16.1.0, Sep. 2019, "3rd Generation Partnership Project; Technical Specification Group Core Network and Terminals; 5G System; Network Exposure Function Northbound APIs; Stage 3 (Release 16)," 82 pages.
(Continued)

*Primary Examiner* — Scott M Sciacca
(74) *Attorney, Agent, or Firm* — Conley Rose, P.C.

(57) ABSTRACT

A network API capability reporting method includes: A first entity receives first information, where the first information is used to subscribe to an API capability of a network that serves a terminal device. The first entity sends second information to a second entity when a type of the network that serves the terminal device changes, where the second information includes an API capability of a network that currently serves the terminal device, and where the API capability includes an API supported by the network that serves the terminal device and an availability feature of at least one API in the supported API.

20 Claims, 13 Drawing Sheets

(51) Int. Cl.
*H04L 65/1063* (2022.01)
*H04L 65/611* (2022.01)
*H04L 67/02* (2022.01)
*H04W 4/50* (2018.01)
*H04W 24/10* (2009.01)
*H04W 36/00* (2009.01)
*H04W 36/14* (2009.01)

(52) U.S. Cl.
CPC ............... *H04L 67/02* (2013.01); *H04W 4/50* (2018.02); *H04W 24/10* (2013.01); *H04W 36/00222* (2023.05)

(56) References Cited

U.S. PATENT DOCUMENTS

| 2018/0270780 A1* | 9/2018 | Xiong | H04L 69/00 |
| 2019/0020549 A1* | 1/2019 | Kim | H04L 41/12 |
| 2021/0014759 A1* | 1/2021 | Zhu | H04L 69/24 |

FOREIGN PATENT DOCUMENTS

| CN | 105704108 A | 6/2016 |
| CN | 105981471 A | 9/2016 |
| CN | 108111629 A | 6/2018 |
| CN | 109246653 A | 1/2019 |
| CN | 110366145 A | 10/2019 |

OTHER PUBLICATIONS

3GPP TS 29.122 V16.3.0, Sep. 2019, "3rd Generation Partnership Project; Technical Specification Group Core Network and Terminals; T8 reference point for Northbound APIs; (Release 16)," 322 pages.

3GPP TS 23.502 V16.2.0, Sep. 2019, "3rd Generation Partnership Project; Technical Specification Group Services and System Aspects; Procedures for the 5G System (5GS); Stage 2 (Release 16)," Sep. 2019, 525 pages.

3GPP TS 23.501 V16.2.0, Sep. 2019, "3rd Generation Partnership Project; Technical Specification Group Services and System Aspects; System Architecture for the 5G System (5GS); Stage 2 (Release 16)," 389 pages.

Huawei, "Corrections on Network Parameter Configuration," 3GPP TSG-CT WG3 Meeting #97, C3-183639, Osaka, Japan, May 21-25, 2018, 11 pages.

Secretary of SA WG2, "Draft Report of SA WG2 meetings #128," SA WG2 Meeting #S2-128BIS, S2-187631, Aug. 20-24, 2018, Sophia Antipolis, France, 475 pages.

Huawei et al., "Resolve the editor"s notes in Solution 14," 3GPP TSG-SA WG2 Meeting #127 Bis, S2-185115, May 28-Jun. 1, 2018, 8 pages.

3GPP TR 23.724 v16.1.0, Jun. 2019, "3rd Generation Partnership Project; Technical Specification Group Services and System Aspects; Study on Cellular Internet of Things (IoT) support and evolution for the 5G System (Release 16)," 274 pages.

* cited by examiner

NETWORK API CAPABILITY REPORTING METHOD, APPARATUS, AND SYSTEM

CROSS-REFERENCE TO RELATED APPLICATION

This is a continuation of International Patent Application No. PCT/CN2020/118092, filed on Sep. 27, 2020, which claims priority to Chinese Patent Application No. 201910936851.X, filed on Sep. 29, 2019. The disclosures of the aforementioned applications are hereby incorporated by reference in their entireties.

TECHNICAL FIELD

This application relates to the field of communication technologies, and in particular, to a network application platform interface (e.g., application programming interface (API)) capability reporting method, apparatus, and system.

BACKGROUND

A 3rd Generation Partnership Project (3GPP) defines a network capability exposure architecture. The architecture mainly provides a third-party application with a series of application programming interfaces (APIs), used by a terminal device to access a 3GPP network, obtain a network status and a user status of the terminal device, adjust and optimize network performance, and affect user behavior of the terminal device.

In a 4th generation (4G) network architecture, an application server (e.g., service capability server/application server (SCS/AS)) may request, through a T8 interface provided by a service capability exposure function (SCEF) entity, an API capability for accessing a 3GPP network, such that the SCS/AS can invoke a related API rather than incorrectly invoke other APIs.

In a 5th generation (5G) architecture, an application function (AF) entity may request, through an Nnef interface or an N33 interface provided by a network exposure function (NEF) entity, an API capability for accessing a 3GPP network, such that the AF entity can invoke a related API rather than incorrectly invoke other APIs.

In an interworking architecture in which the 4G network and the 5G network are jointly deployed, different networks that serve a terminal device have different API capabilities. The API capability includes an API supported by a network that serves the terminal device and an availability feature of the API. Further, when the terminal device is handed over from the 4G network to the 5G network, or is handed over from the 5G network to the 4G network, the SCS/AS or the AF entity cannot accurately learn of an API capability of a network that currently serves the terminal device. Consequently, the SCS/AS or the AF entity cannot determine which API capabilities of the network that can be subscribed to currently, or whether an API capability of the network that is being subscribed to is affected. As a result, the SCS/AS or the AF entity incorrectly invokes an API and a feature of the API.

SUMMARY

This application provides a network API capability reporting method, apparatus, and system, to resolve a problem in a conventional technology that an incorrect operation on an API capability is caused because the API capability may change in different networks.

According to a first aspect, this application provides a network API capability reporting method, including: A first entity receives first information, where the first information is used to subscribe to an API capability of a network that serves a terminal device; and the first entity sends second information to a second entity when a type of the network that serves the terminal device changes, where the second information includes an API capability of a network that currently serves the terminal device, and where the API capability includes an API supported by the network that serves the terminal device and an availability feature of at least one API in the supported API.

According to the network API capability reporting method provided in the first aspect, the first entity receives the first information, where the first information is used to subscribe to the API capability of the network that serves the terminal device, such that the first entity learns that a requirement for subscribing to the API capability of the network that serves the terminal device is triggered. Therefore, when the type of the network that serves the terminal device changes, the first entity sends the second information to the second entity, where the second information includes the API capability of the network that currently serves the terminal device, and where the API capability includes the API supported by the network that serves the terminal device and the availability feature of the at least one API in the supported API. As such, the second entity can learn in time the API supported by the network that currently serves the terminal device and effectively avoid incorrect API invoking. In addition, the second entity can learn in time the feature of the at least one API in the supported API and effectively avoid incorrect API feature use. This resolves a problem in a conventional technology that an incorrect operation on an API capability is caused because the API capability may change with the type of the network that serves the terminal device, improves operation performance of the second entity, and saves operation time of the second entity.

In a possible design, the first entity includes a service capability exposure function (SCEF) entity and/or a network exposure function (NEF) entity, and the second entity includes a service capability server/application server (SCS/AS), an application function (AF) entity, or another function entity.

In a possible design, that a first entity receives first information includes the following.

The first entity receives the first information from the second entity, where the second entity is an SCS/AS or an AF entity.

In a possible design, that a first entity receives first information includes the following.

The first entity receives the first information from a third entity, where the third entity is an SCS/AS or an AF entity, and the third entity is different from the second entity.

In a possible design, the availability feature of the at least one API is all availability features of all APIs. As such, the second entity can comprehensively learn of the API capability supported by the network that currently serves the terminal device.

In a possible design, the availability feature of the at least one API is an availability feature of an API that has been subscribed to and has not expired. As such, the second entity is notified in time whether an API that has been subscribed to in advance by the second entity and has not expired is supported by the network that currently serves the terminal device.

In a possible design, the availability feature of the at least one API is an availability feature of an API of interest. As such, the second entity learns in time whether an API learned of by the second entity to meet a service requirement is supported by the network that currently serves the terminal device.

In a possible design, the availability feature of the at least one API includes an availability feature of an API that has been subscribed to and has not expired and an availability feature of an API of interest. In this way, the second entity not only can learn whether an API that has been subscribed to in advance by the second entity and has not expired is supported by the network that currently serves the terminal device, but also can learn whether an API learned of by the second entity to meet a service requirement is supported by the network that currently serves the terminal device.

According to a second aspect, this application provides a network API capability reporting method, including: A second entity sends first information to a first entity, where the first information is used to subscribe to an API capability of a network that serves a terminal device; and the second entity receives second information from the first entity when a type of the network that serves the terminal device changes, where the second information includes an API capability of a network that currently serves the terminal device, and where the API capability includes an API supported by the network that serves the terminal device and an availability feature of at least one API in the supported API.

According to the network API capability reporting method provided in the second aspect, the second entity sends the first information to the first entity, where the first information is used to subscribe to the API capability of the network that serves the terminal device, such that the first entity learns that a requirement for subscribing to the API capability of the network that serves the terminal device is triggered. Therefore, when the type of the network that serves the terminal device changes, the first entity sends the second information to the second entity, where the second information includes the API capability of the network that currently serves the terminal device, and the API capability includes the API supported by the network that serves the terminal device and the availability feature of the at least one API in the supported API, such that the second entity can learn in time the API supported by the network that currently serves the terminal device and effectively avoid incorrect API invoking. In addition, the second entity can learn in time the feature of the at least one API in the supported API and effectively avoid incorrect API feature use. This resolves a problem in a conventional technology that an incorrect operation on an API capability is caused because the API capability may change with the type of the network that serves the terminal device, improves operation performance of the second entity, and saves operation time of the second entity.

In a possible design, the first entity includes an SCEF entity and/or an NEF entity, and the second entity includes an SCS/AS or an AF entity.

In a possible design, the availability feature of the at least one API is all availability features of all APIs.

In a possible design, the availability feature of the at least one API is an availability feature of an API that has been subscribed to and has not expired.

In a possible design, the availability feature of the at least one API is an availability feature of an API of interest.

In a possible design, the availability feature of the at least one API includes an availability feature of an API that has been subscribed to and has not expired and an availability feature of an API of interest.

According to a third aspect, this application provides a network API capability reporting apparatus, including a receiving module and a sending module. The receiving module is configured to receive first information, where the first information is used to subscribe to an API capability of a network that serves a terminal device. The sending module is configured to send second information to a second entity when a type of the network that serves the terminal device changes, where the second information includes an API capability of a network that currently serves the terminal device, and where the API capability includes an API supported by the network that serves the terminal device and an availability feature of at least one API in the supported API.

In a possible design, the apparatus is used in a first entity, where the first entity includes an SCEF entity and/or an NEF entity, and the second entity includes an SCS/AS, an AF entity, or another function entity.

In a possible design, the receiving module is configured to receive the first information from the second entity, where the second entity is an SCS/AS or an AF entity.

In a possible design, the receiving module is configured to receive the first information from a third entity, where the third entity is an SCS/AS or an AF entity, and where the third entity is different from the second entity.

In a possible design, the availability feature of the at least one API is all availability features of all APIs.

In a possible design, the availability feature of the at least one API is an availability feature of an API that has been subscribed to and has not expired.

In a possible design, the availability feature of the at least one API is an availability feature of an API of interest.

In a possible design, the availability feature of the at least one API includes an availability feature of an API that has been subscribed to and has not expired and an availability feature of an API of interest.

For beneficial effects of the network API capability reporting apparatus provided in the third aspect and the possible designs of the third aspect, refer to beneficial effects brought by the first aspect and various possible implementations of the first aspect. Details are not described herein again.

According to a fourth aspect, this application provides a network API capability reporting apparatus, including a sending module and a receiving module. The sending module is configured to send first information to a first entity, where the first information is used to subscribe to an API capability of a network that serves a terminal device. The receiving module is configured to receive second information from the first entity when a type of the network that serves the terminal device changes, where the second information includes an API capability of a network that currently serves the terminal device, and where the API capability includes an API supported by the network that serves the terminal device and an availability feature of at least one API in the supported API.

In a possible design, the first entity includes an SCEF entity and/or an NEF entity. The apparatus is used in a second entity, where the second entity includes an SCS/AS or an AF entity.

In a possible design, the availability feature of the at least one API is all availability features of all APIs.

In a possible design, the availability feature of the at least one API is an availability feature of an API that has been subscribed to and has not expired.

In a possible design, the availability feature of the at least one API is an availability feature of an API of interest.

In a possible design, the availability feature of the at least one API includes an availability feature of an API that has been subscribed to and has not expired and an availability feature of an API of interest.

For beneficial effects of the network API capability reporting apparatus provided in the fourth aspect and the possible designs of the fourth aspect, refer to beneficial effects brought by the second aspect and various possible implementations of the second aspect. Details are not described herein again.

According to a fifth aspect, this application provides an API capability reporting system, including the network API capability reporting apparatus provided in the third aspect and the possible designs of the third aspect and the network API capability reporting apparatus provided in the fourth aspect and the possible designs of the fourth aspect.

According to a sixth aspect, this application provides an API capability reporting apparatus, including a memory and a processor.

The memory is configured to store program instructions.

The processor is configured to invoke the program instructions in the memory to perform the network API capability reporting method according to any one of the first aspect and the possible designs of the first aspect.

According to a seventh aspect, this application provides an API capability reporting apparatus, including a memory and a processor.

The memory is configured to store program instructions.

The processor is configured to invoke the program instructions in the memory to perform the network API capability reporting method according to any one of the second aspect and the possible designs of the second aspect.

According to an eighth aspect, this application provides a readable storage medium. The readable storage medium stores executable instructions. When at least one processor of an API capability reporting apparatus executes the executable instructions, the API capability reporting apparatus performs the network API capability reporting method according to any one of the first aspect and the possible designs of the first aspect.

According to a ninth aspect, this application provides a readable storage medium. The readable storage medium stores executable instructions. When at least one processor of an API capability reporting apparatus executes the executable instructions, the API capability reporting apparatus performs the network API capability reporting method according to any one of the second aspect and the possible designs of the second aspect.

According to a tenth aspect, this application provides a program product, where the program product includes executable instructions, and the executable instructions are stored in a readable storage medium. At least one processor of an API capability reporting apparatus may read the executable instructions from the readable storage medium, and the at least one processor executes the executable instructions, to enable the API capability reporting apparatus to implement the network API capability reporting method according to any one of the first aspect and the possible designs of the first aspect.

According to an eleventh aspect, this application provides a program product, where the program product includes executable instructions, and the executable instructions are stored in a readable storage medium. At least one processor of an API capability reporting apparatus may read the executable instructions from the readable storage medium, and the at least one processor executes the executable instructions, to enable the API capability reporting apparatus to implement the network API capability reporting method according to any one of the second aspect and the possible designs of the second aspect.

According to a twelfth aspect, this application provides a chip. The chip is connected to a memory, or the chip is integrated with the memory. When a software program stored in the memory is executed, the network API capability reporting method according to any one of the first aspect and the possible designs of the first aspect is implemented.

According to a thirteenth aspect, this application provides a chip. The chip is connected to a memory, or the chip is integrated with the memory. When a software program stored in the memory is executed, the network API capability reporting method according to any one of the second aspect and the possible designs of the second aspect is implemented.

DESCRIPTION OF EMBODIMENTS

In this application, it should be explained that terms such as "first" and "second" are merely intended for a purpose of description, and shall not be understood as an indication or implication of relative importance. In addition, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. The term "at least one of the following items (pieces)" or a similar expression thereof means any combination of these items, including any combination of singular items (pieces) or plural items (pieces). For example, at least one (piece) of a, b, or c may represent: a single a, a single b, a single c, a combination of a and b, a combination of a and c, a combination of b and c, or a combination of a, b, and c, where a, b, and c may be singular or plural.

Figure 1:
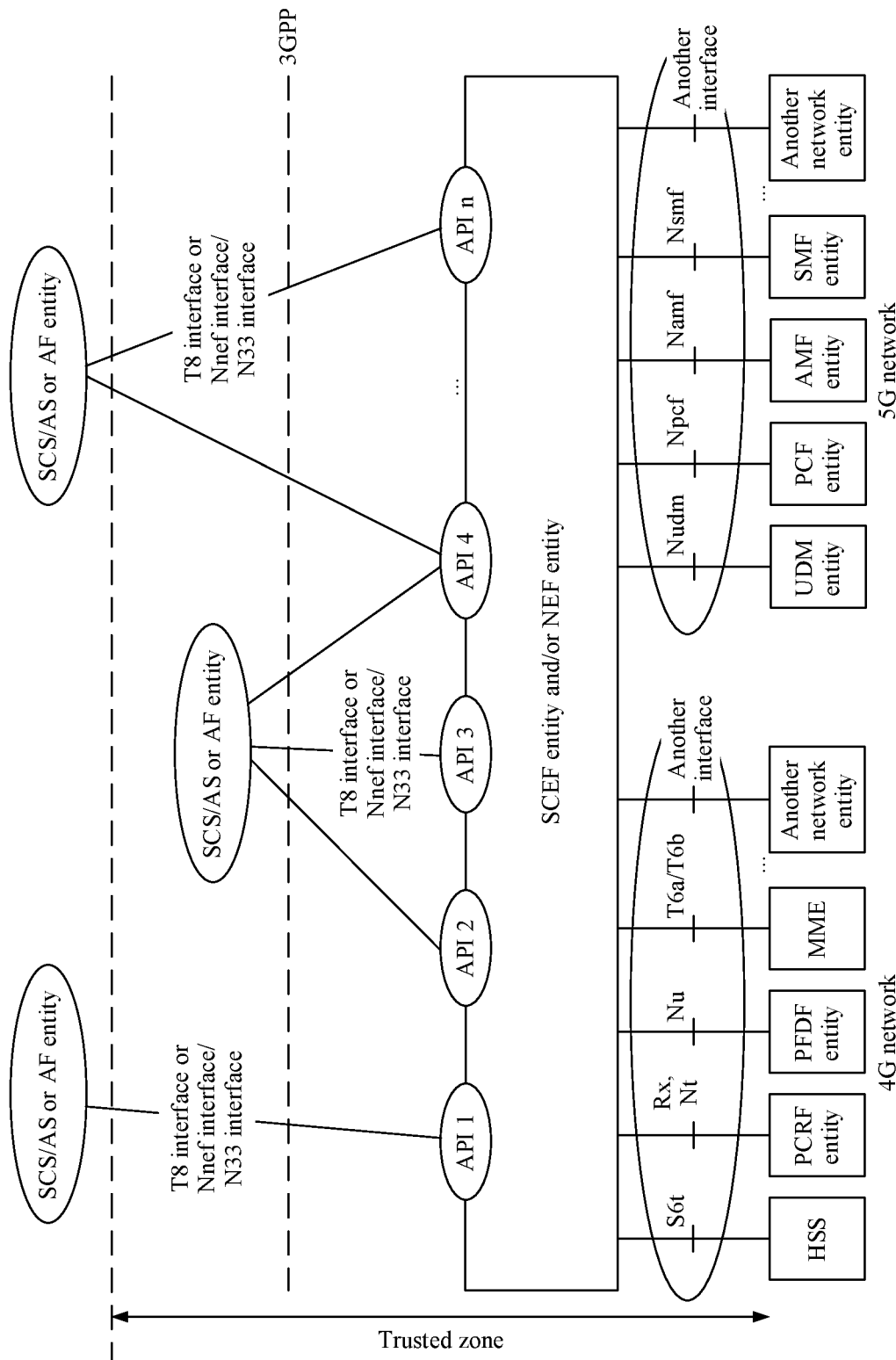
FIG. 1 is a schematic diagram of an API capability reporting system according to an embodiment of this application.

FIG. 1 is a schematic diagram of an architecture of an API capability reporting system. As shown in FIG. 1, the API capability reporting system in this application is an interworking architecture in which a 4G network and a 5G network are jointly deployed. The API capability reporting system may include a 4G network capability exposure architecture, a 5G network capability architecture, and a third-party application.

The 4G network capability exposure architecture and the 5G network capability architecture not only may provide the third-party application with a series of API capabilities, but also may obtain a network status and a user status, adjust and optimize network performance, and affect user behavior.

The third-party application mentioned in this application may include one or more SCSs/ASs or AF entities. The 4G network capability exposure architecture and the 5G network capability architecture may provide one or more APIs for any one of the SCSs/ASs or the AF entities. This is not limited in this application. For example, the 4G network capability exposure architecture and the 5G network capability architecture provide only an API 1 for an SCS 1. The 4G network capability exposure architecture and the 5G network capability architecture provide an API 2, an API 3, and an API 4 for an SCS 2. In addition, APIs provided for any two SCSs/ASs or AF entities may be the same or different. This is not limited in this application. For example, APIs provided for the SCS 2 include the API 2, the API 3, and the API 4. APIs provided for an SCS 3 include an API 4 and an API 8.

In addition, each SCS/AS or AF entity may correspond to one or more terminal devices. This is not limited in this application.

The terminal device may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, for example, a mobile phone (or referred to as a "cellular" phone), or a computer with the mobile terminal, for example, a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a remote station, a remote terminal, an access terminal, a user terminal, a user agent, or a user equipment (UE). This is not limited herein. In addition, the terminal device may use an iOS or an Android mobile operating system. This is not limited in the embodiments of this application.

The 4G network capability exposure architecture mentioned in this application may include a mobility management entity (MME), a home subscriber server (HSS), a policy and charging rule function (PCRF) entity, a packet flow description function (PFDF) entity, an SCEF entity, and another network entity, e.g., another function entity.

The MME is mainly responsible for all control plane functions of user mobility management and session management, including management of non-access stratum (NAS) signaling and security and a tracking area list and selection of a packet data network (PDN) gateway (P-GW) and a serving gateway (S-GW). The MME is connected to the SCEF entity through a T6a/T6b interface (interface).

The HSS is mainly responsible for storing subscription data of mobile users, and is connected to the SCEF entity through an S6t interface.

The PCRF entity is mainly responsible for charging management and policy control, including delivery and adjustment of policy and charging control (PCC) and quality of service (QoS) rules, and is connected to the SCEF entity through Rx and Nt interfaces.

The PFDF entity is mainly responsible for pushing packet flow description information to a policy and charging enforcement function (PCEF) for packet detection, and is connected to the SCEF entity through an Nu interface.

The SCEF entity is mainly responsible for providing a third-party application with an interface for accessing a 3GPP network capability and obtaining a series of statuses of a network or a terminal device. Alternatively, the SCEF entity is configured to adjust and optimize network performance, affect user behavior, and the like.

In the 4G network capability exposure architecture, the SCS/AS in the third-party application requests to access the 3GPP network API capability through a T8 interface provided by the SCEF entity. However, the third-party application cannot detect an internal topology of a 3GPP network. After receiving the request from the SCS/AS, the SCEF entity interacts with an internal network element (for example, the HSS, the PCRF entity, or the PFDF entity) in the 3GPP network, to complete an end-to-end process.

As shown in Table 1, the T8 interface may be presented using a series of API capabilities.

TABLE 1

| Sequence number | API name | Function description |
|---|---|---|
| 1 | Event monitoring API | A third-party service platform invokes the API to obtain status information of a terminal device or subscribe to a status change notification of the terminal device, such as reachability, location reporting, unreachability, a roaming status, an international mobile subscriber identity (international mobile subscriber identification number, IMSI)-international mobile equipment identity (IMEI) (SV) change notification, or a quantity of terminal devices in a specified area. |
| 2 | Broadcast message API(xMB) | The API is invoked to deliver service data to a machine type communication (machine type communication, MTC) device in a multimedia broadcast multicast service (multimedia broadcast multicast service, MBMS) broadcast xMB manner. |
| 3 | Broadcast message API (MB2) | The API is invoked to deliver service data to an MTC device in an MBMS broadcast MB2 manner. |
| 4 | Bandwidth management API | The API is invoked to request to allocate a bandwidth and a bandwidth priority to an application or a session in the application. |
| 5 | Network parameter configuration API | The API is invoked to configure a parameter on a network side to affect a terminal device/network behavior, such as a power saving mode (power saving mode, PSM), discontinuous reception (discontinuous reception, DRX) in a monitoring periodicity of a terminal, or cache performance, to save power of the terminal. |
| 6 | Background traffic API | The API is invoked to obtain network policy information transmitted by using background traffic, such as a transmission time window, a transmission rate, and fees. |
| 7 | Packet flow description management API | A third-party over the top (over the top, OTT) application invokes the API to pay for service data traffic of a subscriber. |
| 8 | Charging mode API | The API is invoked to request a carrier network to change a charging mode, for example, user payment or third-party payment. |
| 9 | Communication mode API | The API is invoked to send a predictable communication mode of a terminal device to a carrier network for proper use of network resources. |
| 10 | Network status query API | This API is invoked to query a wireless network congestion status in a specified area. |
| 11 | Non-IP data transmission API | The API is invoked to send a non-internet protocol (internet protocol, IP) small-packet data between an application and a cellular internet of things (cellular internet of things, CIoT) terminal. |
| 12 | Device trigger API | The API is invoked to trigger a terminal device to initiate some actions, such as app update. |
| 13 | Coverage enhancement API | A third-party application invokes the API to request a carrier network to enhance a wireless coverage capability. |
| 14 | SMS message delivery API | The API is invoked to receive an SMS message. |

The 5G network capability architecture mentioned in this application may include a core network access and mobility management function (AMF) entity, a session management function (SMF) entity, a unified data management (UDM) entity, a policy control function (PCF) entity, an NEF entity, another network entity (e.g., another function entity), and the like.

The AMF entity is mainly responsible for user access and mobility management, and is connected to the NEF entity through an Namf interface.

The SMF entity is mainly responsible for user session management, and is connected to the NEF entity through an Nsmf interface.

The UDM entity is mainly responsible for managing subscription context information of a user, and is connected to the NEF entity through an Nudm interface.

The PCF entity is mainly responsible for delivering and adjusting PCC and QoS policy rules, and is connected to the NEF entity through an Npcf interface.

The NEF entity is mainly responsible for providing a third-party third-partywith an interface for accessing a 3GPP network capability and obtaining a series of statuses of a network or a terminal device. Alternatively, the NEF entity is configured to adjust and optimize network performance, affect user behavior, and the like.

In the 5G network capability architecture, the AF entity in the third-party application requests to access a 3GPP network API capability through an Nnef interface or an N33 interface provided by the NEF entity. However, the third-party application cannot detect an internal topology of a 3GPP network. After receiving the request from the AF entity, the NEF entity interacts with an internal network element (for example, the UDM entity, the PCF entity, or the AMF entity) in the 3GPP network, to complete an end-to-end process.

As shown in Table 2, the Nnef interface or the N33 interface may be presented using a series of API capabilities.

TABLE 2

| Sequence number | API name | Function description |
|---|---|---|
| 1 | Event monitoring API | A third-party service platform invokes the API to obtain status information of a terminal device or subscribe to a status change notification of the terminal device, such as reachability, location reporting, unreachability, a roaming status, and an IMSI-IMEI (SV) change notification or a quantity of terminal devices in a specified area. |
| 2 | Bandwidth management API | The API is invoked to request to allocate a bandwidth and a bandwidth priority to an application or a session in the application. |
| 3 | Network parameter configuration API | The API is invoked to configure a parameter on a network side to affect a terminal device/network behavior, such as a PSM, DRX in a monitoring periodicity of a terminal, or cache performance, to save power of the terminal. |
| 4 | Background traffic API | The API is invoked to obtain network policy information transmitted by using background traffic, such as a transmission time window, a transmission rate, and fees. |
| 5 | Packet flow description management API | A third-party OTT application invokes the API to pay for service data traffic of a subscriber. |
| 6 | Charging mode API | The API is invoked to request a carrier network to change a charging mode, for example, user payment or third-party payment. |
| 7 | Communication mode API | The API is invoked to send a predictable communication mode of a terminal device to a carrier network for proper use of network resources. |
| 8 | Non-IP data transmission API | This API is invoked to send non-IP small-packet data between an application and a CIoT terminal. |
| 9 | Device trigger API | The API is invoked to trigger a terminal device to initiate some actions, such as app update. |
| 10 | Coverage enhancement API | A third-party application invokes the API to request a carrier network to enhance a wireless coverage capability. |
| 11 | SMS message delivery API | The API is invoked to receive an SMS message. |
| 12 | Route influence API | A third-party application invokes the API to influence user-plane path selection. |
| 13 | User capability management API | The API is invoked to push a wireless capability ID of a user. |
| 14 | Analysis exposure API | The API is invoked to obtain big data from a 3GPP network to analyze data. |

Based on the content shown in Table 1 and Table 2, a function supported by the T8 interface overlaps with a function supported by the Nnef interface/N33 interface, that is, these interfaces support same API capabilities, such as the event monitoring API capability and the bandwidth management API capability. In addition, the T8 interface and the Nnef interface/N33 interface support different functions, that is, support different API capabilities.

Compared with the 4G network, the 5G network has more network capabilities, such as big data analysis, slice management, or edge computing. Therefore, even though the T8 interface and the Nnef interface/N33 interface support the same API capabilities, they have different features for a same API. For ease of description, the event monitoring API is used as an example. A feature of the event monitoring API is illustrated with reference to Table 3.

TABLE 3

| Sequence number | Feature Name | Description |
|---|---|---|
| 1 | Connection loss notification | The feature is used to request to notify a third-party application when a network side detects that a user connection is unreachable. The feature is applicable to a T8 interface or an Nnef interface/N33 interface. |
| 2 | User reachability notification | The feature is used to request to notify a third-party application when a network side detects that a user connection is reachable. The feature is applicable to a T8 interface or an Nnef interface/N33 interface. |
| 3 | Location notification | The feature is used to request to notify a third-party application of a location of a user. The feature is applicable to a T8 interface or an Nnef interface/N33 interface. |
| 4 | Phone-card binding change notification | The feature is used to request to notify a third-party application when a network side detects that a phone and a card of a user are detached. The feature is applicable to a T8 interface or an Nnef interface/N33 interface. |
| 5 | Roaming status notification | The feature is used to request to notify a third-party application when a network side detects that a roaming status of a user changes. The feature is applicable to a T8 interface or an Nnef interface/N33 interface. |

TABLE 3-continued

| Sequence number | Feature Name | Description |
|---|---|---|
| 6 | Communication failure notification | The feature is used to request to notify a third-party application when a network side detects that communication fails. The feature is applicable to a T8 interface or an Nnef interface/N33 interface. |
| 7 | Availability notification after digital data network (digital data network, DDN) failure | The feature is used to request to notify a third-party application when a network side detects availability after a user DDN failure. The feature is applicable to a T8 interface or an Nnef interface/N33 interface. |
| 8 | Notification of number of UEs in a geographical area | The feature is used to request to notify a third-party application of a number of UEs in a specified geographical area. The feature is applicable only to a T8 interface. |
| 9 | WebSocket notification | The feature supports a northbound interface to notify of an event via WebSocket. The feature is applicable to a T8 interface or an Nnef interface/N33 interface. |
| 10 | Event test notification | The feature supports a northbound interface to perform an event test via WebSocket. The feature is applicable to a T8 interface or an Nnef interface/N33 interface. |
| 11 | Subscription modification | The feature supports a request of subscription modification. The feature is applicable to a T8 interface or an Nnef interface/N33 interface. |
| 12 | Notification of number of UEs in a 5G area | The feature is used to request to notify a third-party application of a number of UEs in a specified geographical area. The feature is applicable only to an Nnef interface/N33 interface. |
| 13 | Packet data network (packet data network, PDN) connection status notification | The feature is used to request to notify a third-party application when a network side detects establishment or release of a user PDN session. The feature is applicable to a T8 interface or an Nnef interface/N33 interface. |
| 14 | Downlink data transfer status notification | The feature is used to request to notify a third-party application when a network side detects that a downlink data transfer status changes. The feature is applicable only to an Nnef interface/N33 interface. |
| 15 | Enhancement of notification of availability after DDN failure | The feature is used to request to notify a third-party application when a network side detects availability after a user DDN failure and a detected packet matches a service flow sent by an AF. The feature is applicable only to an Nnef interface/N33 interface. |

Based on the content shown in Table 3, the event monitoring APIs for the T8 interface and the Nnef interface/N33 interface may support a same feature, for example, the connection loss notification, the user reachability notification, or the location notification, or may support different features. For example, the T8 interface and the Nnef interface/N33 interface support different features for the notification of number of UEs in a geographical area.

In conclusion, different networks may support different API capabilities, that is, different APIs, and features of a same supported API may also be different. For example, in the 4G network, supported APIs include an API 1 and an API 2, where the API 1 has a feature 12 and a feature 14. In the 5G network, supported APIs include the API 1 and an API 3, where the API 1 has a feature 11 and the feature 12. It can be learned that the APIs supported by the 4G network are different from the APIs supported by the 5G network, and the features of the API 1 supported by the 4G network are different from the features of the API 1 supported by the 5G network.

Based on the foregoing content, as defined in a standard, a third-party application may obtain, by invoking an API corresponding to an API capability support service (Nnef_APISupportCapability service for short), an API capability of a network (serving network for short) that serves a terminal device, that is, a supported API and a feature of the API.

The API corresponding to the Nnef_APISupportCapability service is provided by the SCEF entity in the 4G network capability exposure architecture and/or the NEF entity in the 5G network capability architecture shown in FIG. 1. There may be one or more APIs. In addition, the API may be an unused API, or may be a used API. This is not limited in this application.

It should be noted that, in the communication system shown in FIG. 1, a network entity included in the 4G network capability exposure architecture and a network entity included in the 5G network capability architecture may be jointly deployed or separately deployed based on an actual requirement or an implementation function. This is not limited in this application. For ease of description, in FIG. 1, the SCEF entity in the 4G network capability exposure architecture and the NEF entity in the 5G network capability architecture are jointly deployed, and another network entity in the 4G network capability exposure architecture and another network entity in the 5G network capability architecture are separately deployed.

In an actual application process, a terminal device that supports both 4G network access and 5G network access may register with the 4G network and the 5G network through handover. For example, the terminal device moves from a coverage area of one network to a coverage area of another network, or a user actively switches a network.

When a type of a serving network changes, a third-party application can invoke only an API capability supported by a current serving network. For example, the HSS and the UDM entity in FIG. 1 may detect the type of the serving network in real time. When the serving network changes from the 5G network to the 4G network, the HSS may notify the SCEF entity that the type of the serving network changes. In this case, the SCS/AS can invoke only an API provided by the T8 interface of the SCEF entity and a feature of the API. When the serving network changes from the 4G network to the 5G network, the UDM entity may notify the NEF entity that the type of the serving network changes. In this case, the AF entity can invoke only an API provided by the Nnef interface/N33 interface of the NEF entity and a feature of the API.

When the type of the serving network changes, the API capability supported by the serving network may change. If the third-party application still invokes an API and a feature of the API that are supported by an original serving network, or invokes an API and a feature of an API that are not supported by the current serving network, the third-party application is prone to invoke an incorrect API and use a feature of the incorrect API. To solve the foregoing problem, this application provides a network API capability reporting method, apparatus, and system, and a storage medium. In this way, when the type of the serving network changes, the third-party application not only can learn which APIs of a network can be subscribed to currently or whether an API of the network that is being subscribed to is affected, but also can learn which features of the APIs of the network can be subscribed to currently or whether a feature of an API of the network that is being subscribed to is still valid, to avoid incorrect API invoking and incorrect use of a feature of an invalid API.

Figure 2:
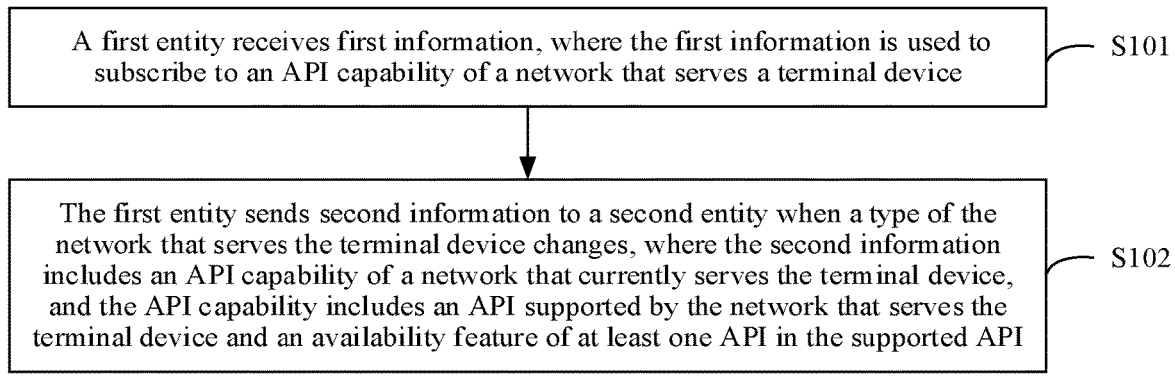
FIG. 2 is a schematic flowchart of a network API capability reporting method according to an embodiment of this application.

Based on the embodiment shown in FIG. 1, with reference to FIG. 2, the following describes in detail an implementation process of the network API capability reporting method in the embodiments of this application using a first entity and a second entity as execution bodies.

The first entity may be the SCEF entity in FIG. 1, the NEF entity in FIG. 1, or an entity in which the SCEF entity and the NEF entity in FIG. 1 are deployed together. This is not limited in this application. The second entity may be the SCS/AS in FIG. 1, the AF entity in FIG. 1, or another function entity in FIG. 1. This is not limited in this application.

FIG. 2 is a schematic flowchart of a network API capability reporting method according to an embodiment of this application. As shown in FIG. 2, the network API capability reporting method in this application may include the following steps.

S101. A first entity receives first information, where the first information is used to subscribe to an API capability of a network that serves a terminal device.

Based on the foregoing description, as defined in the standard, a third-party application may obtain an API capability of a serving network by invoking an API corresponding to an Nnef_APISupportCapability service. Therefore, the first entity may receive the first information using the API corresponding to the Nnef_APISupportCapability service, such that the first entity can learn that a requirement for subscribing to the API capability of the serving network is triggered.

The first information may be identified in a form of a letter, a number, a symbol, a list, a text, or the like. The first information may be carried in a Hypertext Transfer Protocol (HTTP) POST request message, may be carried in an HTTP GET request message, may be carried in an HTTP QUERY request message, or may be carried in another message. This is not limited in this application. In addition to being used to subscribe to the API capability of the serving network, optionally, the first information may be further used to identify a notification destination address (which is a second entity herein in this application) for subscribing to the API capability of the serving network, and/or the first information may be further used to identify a quantity of notifications and/or notification duration for subscribing to the API capability of the serving network.

For example, when the first information is carried in the HTTP POST request message, the first information may include an API uniform resource identifier (URI), an identifier of the terminal device, and a notification destination URI. The API URI is used to identify the API corresponding to the Nnef_APISupportCapability service. The identifier of the terminal device may be an identifier of one terminal device, may be identifiers of a plurality of terminal devices, may be an identifier of a group of terminal devices, or may be an identifier of any device. This is not limited in this application. The notification destination URI is used to identify the notification destination address for subscribing to the API capability of the serving network.

S102. The first entity sends second information to the second entity when a type of the network that serves the terminal device changes, where the second information includes an API capability of a network that currently serves the terminal device, and where the API capability includes an API supported by the network that serves the terminal device and an availability feature of at least one API in the supported API.

Based on the foregoing description, when the terminal device registers with a 4G network and a 5G network through handover, the type of the serving network changes. When the serving network changes, the API capability supported by the serving network may change. To avoid incorrect API invoking and incorrect use of an API feature, each time the type of the serving network changes, the first entity may send the API capability of the current serving network to the second entity, such that the second entity can obtain the API capability of the current serving network in time. In this way, the second entity not only can learn the API supported by the current serving network but also can learn an availability feature of one API or availability features of a plurality of APIs in the supported API. Further, the second entity may select, based on the second information, an API that can be invoked and a feature of the API that can be used, to avoid incorrect invocation or use.

The current serving network is a serving network existing after any network type change. For example, the terminal device moves from a coverage area of a first serving network to a coverage area of a second serving network, the current serving network is the second serving network. For another example, the current serving network is a target network existing after a user performs an active handover.

The second information may be represented in a form of an array, a table, or the like, and the API and the availability feature of the API in the second information may be identified in a form of a letter, a number, a symbol, a list, a text, or the like. The second information may be carried in an HTTP POST request message, may be carried in an HTTP POST response message, or may be carried in another message. This is not limited in this application.

It should be noted that the second entity may be an entity identified by the first information in S101, may be an entity negotiated in advance by the first entity and the second entity, or may be an entity that sends the first information. This is not limited in this application.

Based on the network API capability reporting method provided in this application, the first entity receives the first information, where the first information is used to subscribe to the API capability of the network that serves the terminal device, such that the first entity learns that a requirement for subscribing to the API capability of the network that serves the terminal device is triggered. Therefore, when the type of the network that serves the terminal device changes, the first entity sends the second information to the second entity, where the second information includes the API capability of the network that currently serves the terminal device, and where the API capability includes the API supported by the network that serves the terminal device and the availability feature of the at least one API in the supported API, such that the second entity can learn in time the API supported by the network that currently serves the terminal device and effectively avoid incorrect API invoking. In addition, the second entity can learn in time the feature of the at least one API in the supported API and effectively avoid incorrect API feature use. This resolves a problem in a conventional technology that an incorrect operation on an API capability is caused because the API capability may change with the type of the network that serves the terminal device, improves operation performance of the second entity, and saves operation time of the second entity.

Based on the embodiment shown in FIG. 1, the API included in the second information is generally all APIs supported by the current serving network. Because any API may have one or more features, and a feature of any API may or may not be used in different serving networks, the feature of the API included in the second information needs to meet two conditions. A first condition is that the API in the "feature of the API" is an API supported by the current serving network. A second condition is that the feature in the "feature of the API" is an availability feature of at least one API in the supported API, that is, an availability feature of one API or availability features of a plurality of APIs. A quantity and a type of availability features are not limited in this application.

For example, APIs supported by the 4G network include an API 1, an API 2, and an API 3, where in the 4G network, availability features of the API 1 include a feature 12 and a feature 14, availability features of the API 2 include a feature 21, a feature 23, and a feature 25, and availability features of the API 3 include a feature 32, and a feature 35; and APIs supported by the 5G network include the API 2, the API 3, and an API 4, where in the 5G network, an availability feature of the API 2 includes the feature 23, availability features of the API 3 include the feature 32, a feature 33, and the feature 35, and availability features of the API 4 include a feature 41, a feature 42, and a feature 44. The example is used below to illustrate a representation form of the availability feature of the at least one API using three feasible implementations.

In a feasible implementation, to enable the second entity to comprehensively learn of the API capability of the current serving network, optionally, the availability feature of the at least one API is all availability features of all APIs.

Based on the foregoing content, when the type of the serving network changes from the 5G network to the 4G network, the second information may include the API 1, the API 2, the API 3, all availability features (the feature 12 and the feature 14) of the API 1, all availability features (the feature 21, the feature 23, and the feature 25) of the API 2, and all availability features (the feature 32 and the feature 3) of the API 3. When the type of the serving network changes from the 4G network to the 5G network, the second information may include the API 2, the API 3, the API 4, all availability features (the feature 23) of the API 2, all availability features (the feature 32, the feature 33, and the feature 35) of the API 3, and all availability features (the feature 41, the feature 42, and the feature 44) of the API 4.

It should be noted that the availability feature of the at least one API may be some availability features of all APIs, and a quantity of availability features may be set based on an actual situation. This is not limited in this application.

In another feasible implementation, because the second entity has initiated a subscription creation request for one or more APIs to the first entity in advance, and the foregoing API can still be invoked and has not expired currently, the first entity may determine that the second entity needs to learn whether the foregoing API is supported by the serving network, and whether the feature of the foregoing API is supported by the serving network, that is, whether the foregoing API can be invoked and whether the feature of the foregoing API can be used.

The subscription creation request may be represented in a form of an HTTP POST request message, an HTTP GET request message, an HTTP QUERY request message, or another message. This is not limited in this application.

To notify the second entity in time whether an API that has been subscribed to by the second entity in advance and that has not expired is supported by the serving network and whether a feature of the API is supported by the serving network, optionally, the availability feature of the at least one API is an availability feature of the API that has been subscribed to and has not expired.

Based on the foregoing content, if the API 2 is the API that has been subscribed to and has not expired, when the type of the serving network changes from the 5G network to the 4G network, the second information may include the API 1, the API 2, the API 3, and an availability feature (one or more of the feature 21, the feature 23, or the feature 25) of the API 2. When the type of the serving network changes from the 4G network to the 5G network, the second information may include the API 2, the API 3, the API 4, and the availability feature (the feature 23) of the API 2.

It should be noted that, if the API supported by the current serving network does not include the API that has been subscribed to and has not expired, the second information may include the API supported by the current serving network.

In another feasible implementation, because an application scenario is different and a service requirement corresponding to the second entity is different, an API that the second entity needs to learn of is different. In this application, the API that the second entity needs to learn to meet the service requirement may be defined as an API of interest, that is, a concerned API, such that the second entity can accurately invoke an API based on whether the current serving network supports the API of interest and an availability feature of the API of interest, thereby avoiding incorrect invoking. The service requirement may include but is not limited to location monitoring, quality of service (QOS) adjustment, or the like for the terminal device.

Based on the foregoing content, the first entity may determine the API of interest that the second entity needs to learn of. The API of interest may be determined by negotiation in advance between the first entity and the second entity, may be determined using an identifier of the first information, or may be determined using an identifier of other information. This is not limited in this application.

In addition, the API of interest may be the API that has been subscribed to by the second entity in advance and that has not expired, or may not be the API that has been subscribed to by the second entity in advance and that has not expired. This is not limited in this application. In addition, there may be one or more APIs of interest. This is not limited in this application.

To enable the second entity to learn in time whether the API that needs to be learned by the second entity to meet the service requirement is supported by the serving network and whether the feature of the API is supported by the serving network, optionally, the availability feature of the at least one API is the availability feature of the API of interest.

Based on the foregoing content, if the API 3 is the API of interest, when the type of the serving network changes from the 5G network to the 4G network, the second information may include the API 1, the API 2, the API 3, and an availability feature (one or more of the feature 32 or the feature 35) of the API 3. When the type of the serving network changes from the 4G network to the 5G network, the second information may include the API 2, the API 3, the API 4, and an availability feature (one or more of the feature 32, the feature 33, or the feature 35) of the API 3.

It should be noted that, if the API supported by the current serving network does not include the API of interest, the second information may include the API supported by the current serving network.

In another feasible implementation, when the API supported by the current serving network may include both an API that has been subscribed to and has not expired and an API of interest, optionally, the availability feature of the at least one API includes an availability feature of the API that has been subscribed to and has not expired and an availability feature of the API of interest.

Based on the foregoing content, if the API 2 is the API that has been subscribed to and has not expired, and the API 3 is the API of interest, when the type of the serving network changes from the 5G network to the 4G network, the second information may include the API 1, the API 2, the API 3, an availability feature (one or more of the feature 21, the feature 23, or the feature 25) of the API 2, and an availability feature (one or more of the feature 32 or the feature 35) of the API 3. When the type of the serving network changes from the 4G network to the 5G network, the second information may include the API 2, the API 3, the API 4, the availability feature (the feature 23) of the API 2, and an availability feature (one or more of the feature 32, the feature 33, or the feature 35) of the API 3.

It should be noted that the API that has been subscribed to and has not expired and the API of interest may be a same API, or may be different APIs. This is not limited in this application. In addition, if the API supported by the current serving network does not include the API that has been subscribed to and has not expired or the API of interest, the second information may include the API supported by the current serving network.

Figure 3:
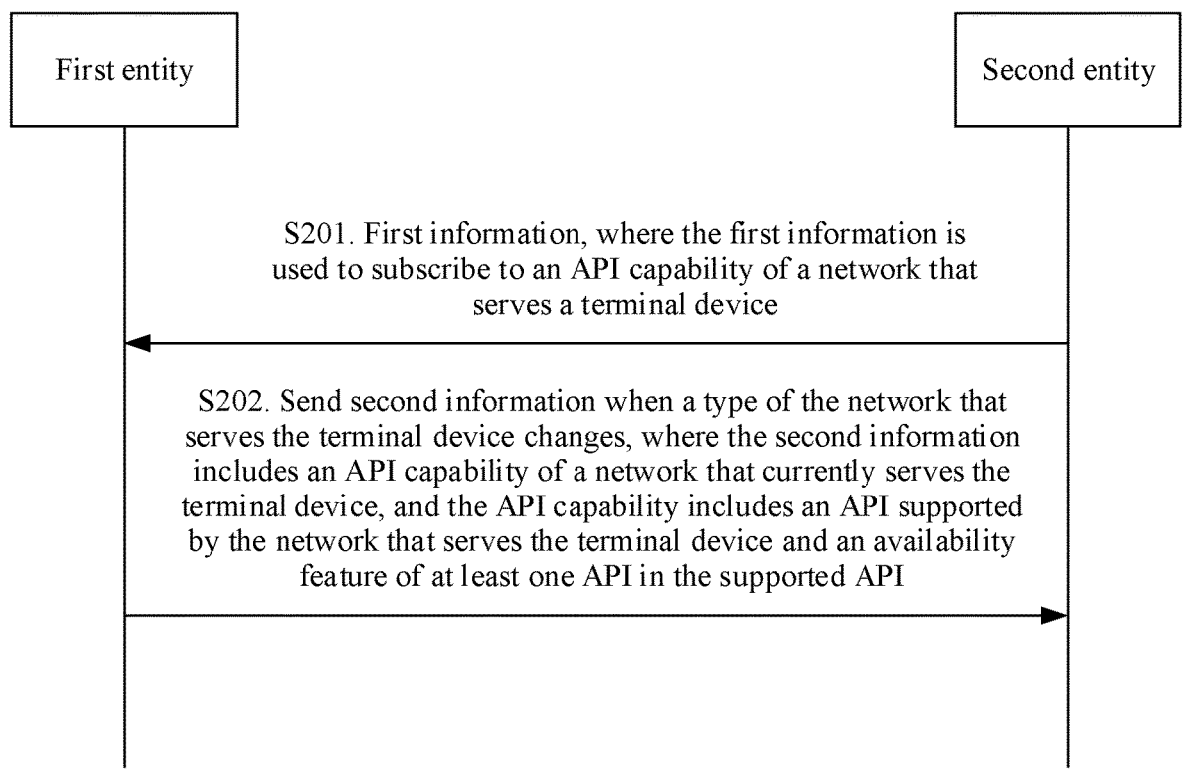
FIG. 3 is a signaling exchanging diagram of a network API capability reporting method according to an embodiment of this application.

In this application, because the first information is sent by an SCS/AS or an AF entity to the first entity, if the second entity is the SCS/AS or the AF entity, the second entity may be used as the SCS/AS or the AF entity that sends the first information to the first entity. With reference to FIG. 3, the following describes in detail an implementation process of the network API capability reporting method in this application.

FIG. 3 is a signaling exchanging diagram of a network API capability reporting method according to an embodiment of this application. As shown in FIG. 3, the network API capability reporting method in this application may include the following steps.

S201. A second entity sends first information to a first entity, where the first information is used to subscribe to an API capability of a network that serves a terminal device, and where the second entity is an SCS/AS or an AF entity.

When the second entity is the SCS/AS or the AF entity, the second entity may send the first information to the first entity using an API corresponding to an Nnef_APISupportCapability service, such that the first entity may learn, based on the first information, that the second entity subscribes to or requests an API capability of a serving network, that is, the second entity triggers a requirement for subscribing to the API capability of the serving network.

An implementation of S201 is similar to the implementation of S101 in the embodiment in FIG. 2. Details are not described herein again in this application.

S202. The first entity sends second information to the second entity when a type of the network that serves the terminal device changes, where the second information includes an API capability of a network that currently serves the terminal device, and where the API capability includes an API supported by the network that serves the terminal device and an availability feature of at least one API in the supported API.

An implementation of S202 is similar to an implementation of S102 in the embodiment in FIG. 2. Details are not described herein again in this application.

In this application, when the second entity is the SCS/AS or the AF entity, the second entity may be used as an entity that subscribes to or requests the API capability of the serving network, or may be used as an entity that receives the API capability of the current serving network. That is, the entity that subscribes to or requests the API capability of the serving network may be the same as the entity that receives the API capability of the current serving network.

In addition, regardless of a type of the second entity, an SCS/AS or an AF entity different from the second entity may be used as an entity that sends the first information to the first entity in this application. It should be noted that different representation forms of a third entity and the second entity may include: The second entity and the third entity are different SCSs/ASs or AF entities. Alternatively, the second entity is another function entity, and the third entity is an SCS/AS or an AF entity.

Figure 4:
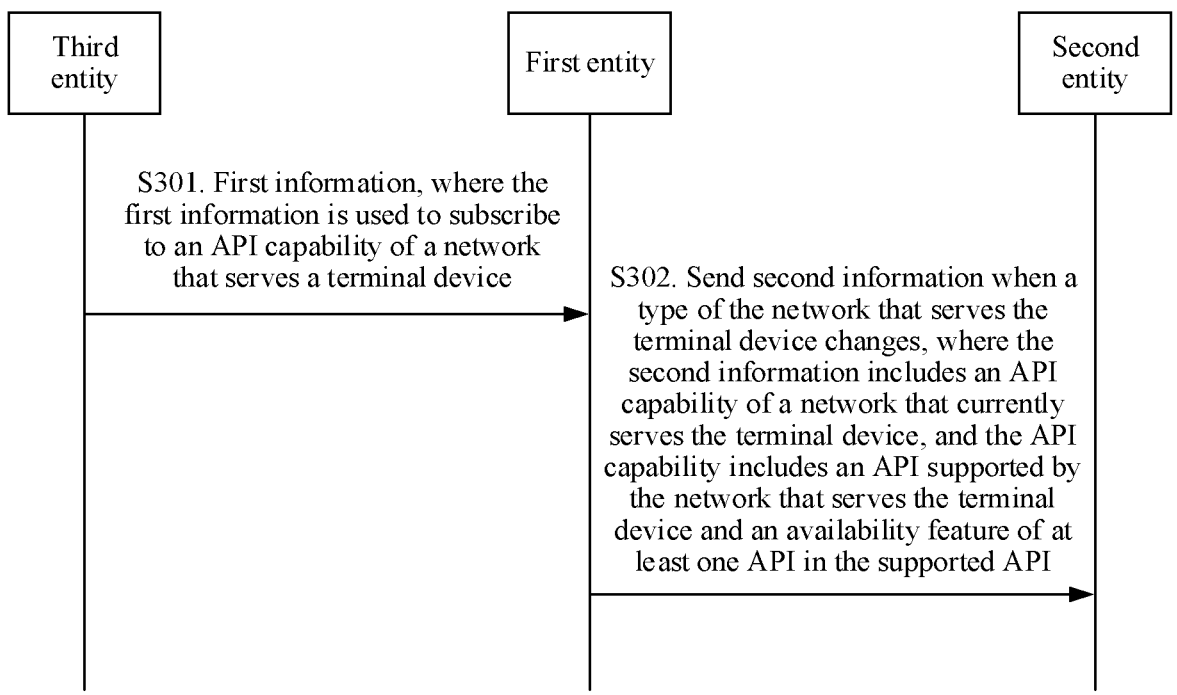
FIG. 4 is a signaling exchanging diagram of a network API capability reporting method according to an embodiment of this application.

With reference to FIG. 4, the following describes in detail an implementation process of the network API capability reporting method in this application. For ease of description, in FIG. 4, an example in which an SCS/AS or the AF entity different from a second entity is a third entity is used for illustration.

FIG. 4 is a signaling exchanging diagram of a network API capability reporting method according to an embodiment of this application. As shown in FIG. 4, the network API capability reporting method in this application may include the following steps.

S301. A third entity sends first information to a first entity, where the first information is used to subscribe to an API capability of a network that serves a terminal device, the third entity is an SCS/AS or an AF entity, and the third entity is different from a second entity.

When the third entity is the SCS/AS or the AF entity, the third entity may send the first information to the first entity using an API corresponding to an Nnef_APISupportCapability service, such that the first entity may learn, based on the first information, that the third entity subscribes to or requests an API capability of a serving network, that is, the third entity triggers a requirement for subscribing to the API capability of the serving network.

An implementation of S201 is similar to the implementation of S101 in the embodiment in FIG. 2. Details are not described herein again in this application.

S302. The first entity sends second information to the second entity when a type of the network that serves the terminal device changes, where the second information includes an API capability of a network that currently serves the terminal device, and the API capability includes an API supported by the network that serves the terminal device and an availability feature of at least one API in the supported API.

An implementation of S302 is similar to the implementation of S102 in the embodiment in FIG. 2. Details are not described herein again in this application.

In this application, when the third entity is the SCS/AS or the AF entity, the third entity may serve as an entity that subscribes to or requests the API capability of the serving network. The second entity may be used as an entity that receives the API capability of the current serving network. The second entity is different from the third entity. That is, the entity that subscribes to or requests the API capability of the serving network may be different from the entity that receives the API capability of the current serving network.

The following describes in detail the technical solution of the network API capability reporting method shown in FIG. 2 using several example embodiments.

Embodiment 1

Figure 5:
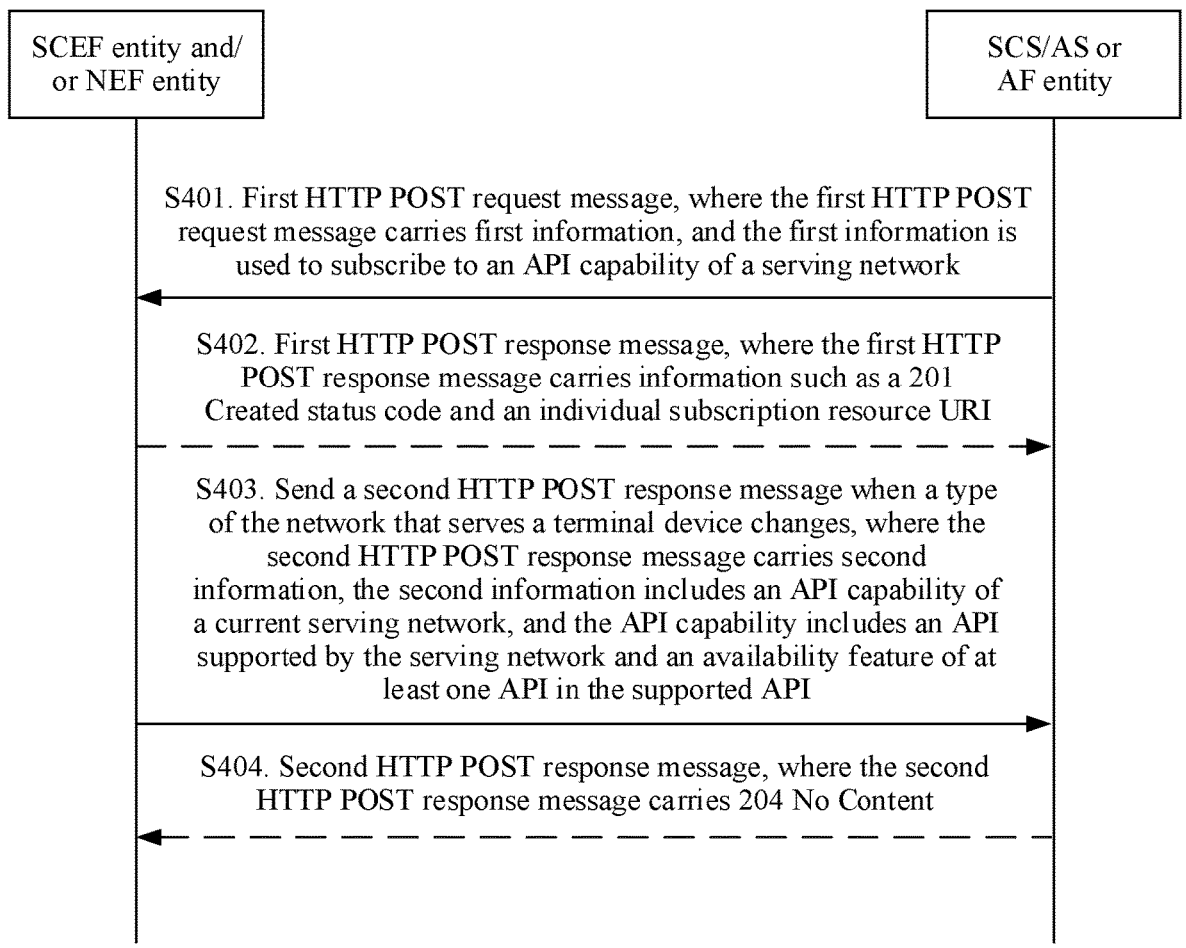
FIG. 5 is a signaling exchanging diagram of a network API capability reporting method according to an embodiment of this application.

In Embodiment 1, with reference to FIG. 5, for example, a first entity is the SCEF entity and/or the NEF entity in FIG. 1, a second entity is the SCS/AS or the AF entity in FIG. 2, an entity that subscribes to or requests an API capability of a serving network is the same as an entity that receives an API capability of a current serving network, first information is carried in an HTTP POST request message, and types of the serving network include a 4G network and a 5G network, where APIs supported by the 4G network include an API 1, an API 2, and an API 3, where in the 4G network, availability features of the API 1 include a feature 12 and a feature 14, availability features of the API 2 include a feature 21, a feature 23, and a feature 25, and availability features of the API 3 include a feature 32, and a feature 35; and APIs supported by the 5G network include the API 2, the API 3, and an API 4, where in the 5G network, an availability feature of the API 2 includes the feature 23, availability features of the API 3 include the feature 32, a feature 33, and the feature 35, and availability features of the API 4 include a feature 41, a feature 42, and a feature 44. The example is used to describe an implementation of the network API capability reporting method in this application.

FIG. 5 is a signaling exchanging diagram of a network API capability reporting method according to an embodiment of this application. As shown in FIG. 5, the network API capability reporting method in this application may include the following steps.

S401. An SCS/AS or an AF entity sends a first HTTP POST request message to an SCEF entity and/or an NEF entity, where the first HTTP POST request message carries first information, and where the first information is used to subscribe to an API capability of a serving network.

S402. The SCEF entity and/or the NEF entity send/sends a first HTTP POST response message to the SCS/AS or the AF entity, where the first HTTP POST response message carries information such as a 201 Created status code and an individual subscription resource URI. S402 is an optional step.

S403. When a type of the serving network changes, the SCEF entity and/or the NEF entity send/sends a second HTTP POST response message to the SCS/AS or the AF entity, where the second HTTP POST response message carries second information, where the second information includes an API capability of a current serving network, and where the API capability includes an API supported by the serving network and an availability feature of at least one API in the supported API.

In this application, when the type of the serving network changes from a 5G network to a 4G network, the second information may include an API 1, an API 2, an API 3, and an availability feature of at least one API in the API 1, the API 2, or the API 3. For example, the second information may include the API 1, the API 2, the API 3, all availability features of the API 1, all availability features of the API 2, and all availability features of the API 3. When the type of the serving network changes from the 4G network to the 5G network, the second information may include the API 2, the API 3, the API 4, and an availability feature of at least one API in the API 2, the API 3, or the API 4. For example, the second information may include the API 2, the API 3, the API 4, all availability features of the API 2, all availability features of the API 3, and all availability features of the API 4.

S404. The SCS/AS or the AF entity sends a second HTTP POST response message to the SCEF entity and/or the NEF entity, where the second HTTP POST response message carries 204 No Content.

S404 is an optional step.

Embodiment 2

A person skilled in the art may understand that, after a request is initiated, a response is generally obtained. Different from Embodiment 1, in Embodiment 2, after a second entity sends first information to a first entity, the first entity may notify the second entity that an API capability of a network is successfully subscribed to or requested. In addition, if a type of a current serving network changes, the second entity may notify the first entity of a success in subscribing to an API capability of a serving network and an API capability of the current serving network. Based on the foregoing scenario, with reference to FIG. 6, an implementation of the network API capability reporting method in this application is described using an example.

Figure 6:
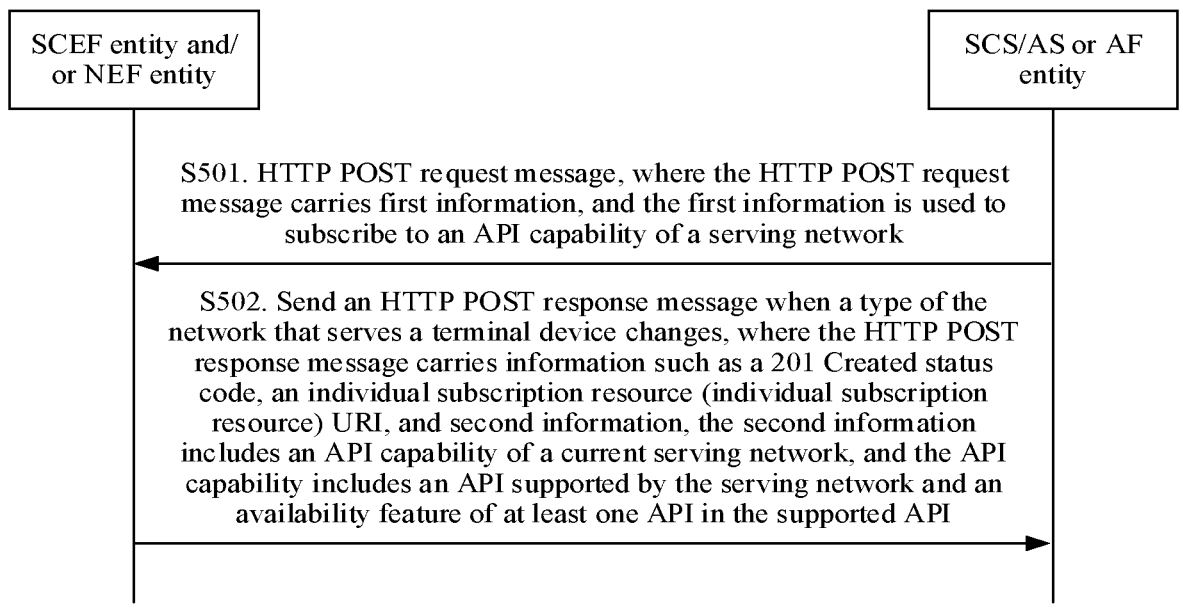
FIG. 6 is a signaling exchanging diagram of a network API capability reporting method according to an embodiment of this application.

FIG. 6 is a signaling exchanging diagram of a network API capability reporting method according to an embodiment of this application. As shown in FIG. 6, the network API capability reporting method in this application may include the following steps.

S501. An SCS/AS or an AF entity sends an HTTP POST request message to an SCEF entity and/or an NEF entity, where the HTTP POST request message carries first information, and the first information is used to subscribe to an API capability of a serving network.

S502. When a type of the serving network changes, the SCEF entity and/or the NEF entity send/sends an HTTP POST response message to the SCS/AS or the AF entity, where the HTTP POST response message carries information such as a 201 Created status code, an individual subscription resource ( ) URI, and second information, where the second information includes an API capability of a current serving network, and where the API capability includes an API supported by the serving network and an availability feature of at least one API in the supported API.

In this application, when the SCEF entity and/or the NEF entity send/sends the HTTP POST response message to the SCS/AS or the AF entity, if the type of the current serving network changes, the SCEF entity and/or the NEF entity may add the second information into the HTTP POST response message and send the message to the second entity. This not only enables the second entity to learn of the success in subscribing to the API capability of the serving network, but also enables the second entity to learn of the API capability of the current serving network.

The 201 Created status code is used to identify that the second entity has successfully subscribed to the API capability of the serving network. Certainly, the HTTP POST response message may further use a success response identifier different from the foregoing status code to indicate that the second entity has successfully subscribed to the API capability of the serving network. In addition, the foregoing success response identifier may be included in the second information, or may be included in other information of the HTTP POST response message. This is not limited in this application.

The individual subscription resource URI may be generated by the first entity based on a first message, and is used to uniquely identify an individual subscription resource, such that the second entity learns of the individual subscription resource.

An implementation of S502 is similar to the implementation of S403 in the embodiment in FIG. 5. Details are not described herein again in this application.

Embodiment 3

Different from Embodiment 1, in Embodiment 3, a second entity has subscribed to an API 2 from a first entity. Based on the foregoing scenario, with reference to FIG. 7, an implementation of the network API capability reporting method in this application is described using an example.

Figure 7:
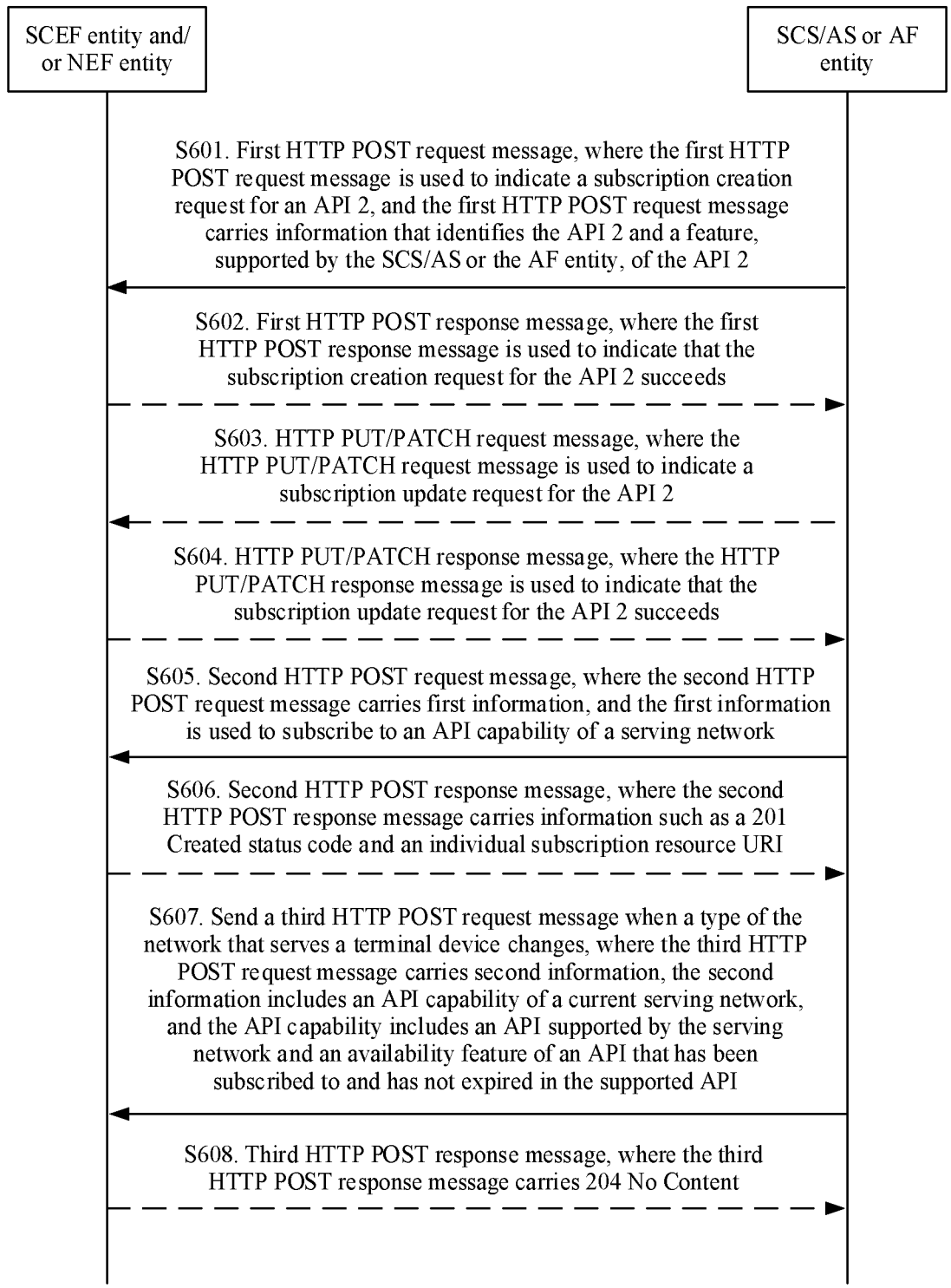
FIG. 7 is a signaling exchanging diagram of a network API capability reporting method according to an embodiment of this application.

FIG. 7 is a signaling exchanging diagram of a network API capability reporting method according to an embodiment of this application. As shown in FIG. 7, the network API capability reporting method in this application may include the following steps.

S601. An SCS/AS or an AF entity sends a first HTTP POST request message to an SCEF entity and/or an NEF entity, where the first HTTP POST request message is used to indicate a subscription creation request for an API 2, and where the first HTTP POST request message carries information that identifies the API 2 and a feature, supported by the SCS/AS or the AF entity, of the API 2.

It should be noted that when the API 2 does not have a feature supported by the SCS/AS or the AF entity, the first HTTP POST request message carries information that identifies the API 2. In addition, the first HTTP POST request message may further carry information such as an identifier of a terminal device.

S602. The SCEF entity and/or the NEF entity send/sends a first HTTP POST response message to the SCS/AS or the AF entity, where the first HTTP POST response message is used to indicate that the subscription creation request for the API 2 succeeds.

S602 is an optional step.

S603. The SCS/AS or the AF entity sends an HTTP PUT/PATCH request message to the SCEF entity and/or the NEF entity, where the HTTP PUT/PATCH request message is used to indicate a subscription update request for the API 2.

S603 is an optional step.

S604. The SCS/AS or the AF entity sends an HTTP PUT/PATCH response message to the SCEF entity and/or the NEF entity, where the HTTP PUT/PATCH response message is used to indicate that the subscription update request for the API 2 succeeds.

S604 is an optional step.

S605. The SCS/AS or the AF entity sends a second HTTP POST request message to the SCEF entity and/or the NEF entity, where the second HTTP POST request message carries first information, and the first information is used to subscribe to an API capability of a serving network.

S606. The SCEF entity and/or the NEF entity send/sends a second HTTP POST response message to the SCS/AS or the AF entity, where the second HTTP POST response message carries information such as a 201 Created status code and an individual subscription resource URI.

S606 is an optional step.

S607. When a type of the serving network changes, the SCEF entity and/or the NEF entity send/sends a third HTTP POST request message to the SCS/AS or the AF entity, where the third HTTP POST request message carries second information, where the second information includes an API capability of a current serving network, and where the API capability includes an API supported by the serving network and an availability feature of an API that has been subscribed to and has not expired in the supported API.

In this application, when the type of the serving network changes from a 5G network to a 4G network, the second information may include an API 1, an API 2, an API 3, and an availability feature of the API 2. When the type of the serving network changes from the 4G network to the 5G network, the second information may include the API 2, the API 3, an API 4, and the availability feature of the API 2.

S608. The SCS/AS or the AF entity sends a third HTTP POST response message to the SCEF entity and/or the NEF entity, where the third HTTP POST response message carries 204 No Content.

S608 is an optional step.

Embodiment 4

Different from Embodiment 3, in Embodiment 4, after a second entity sends first information to a first entity, the first entity may notify the second entity that an API capability of a network is successfully subscribed to or requested. In addition, if a type of a current serving network changes, the second entity may notify the first entity of a success in subscribing to an API capability of a serving network and an API capability of the current serving network. Based on the foregoing scenario, with reference to FIG. 8, an implementation of the network API capability reporting method in this application is described using an example.

Figure 8:
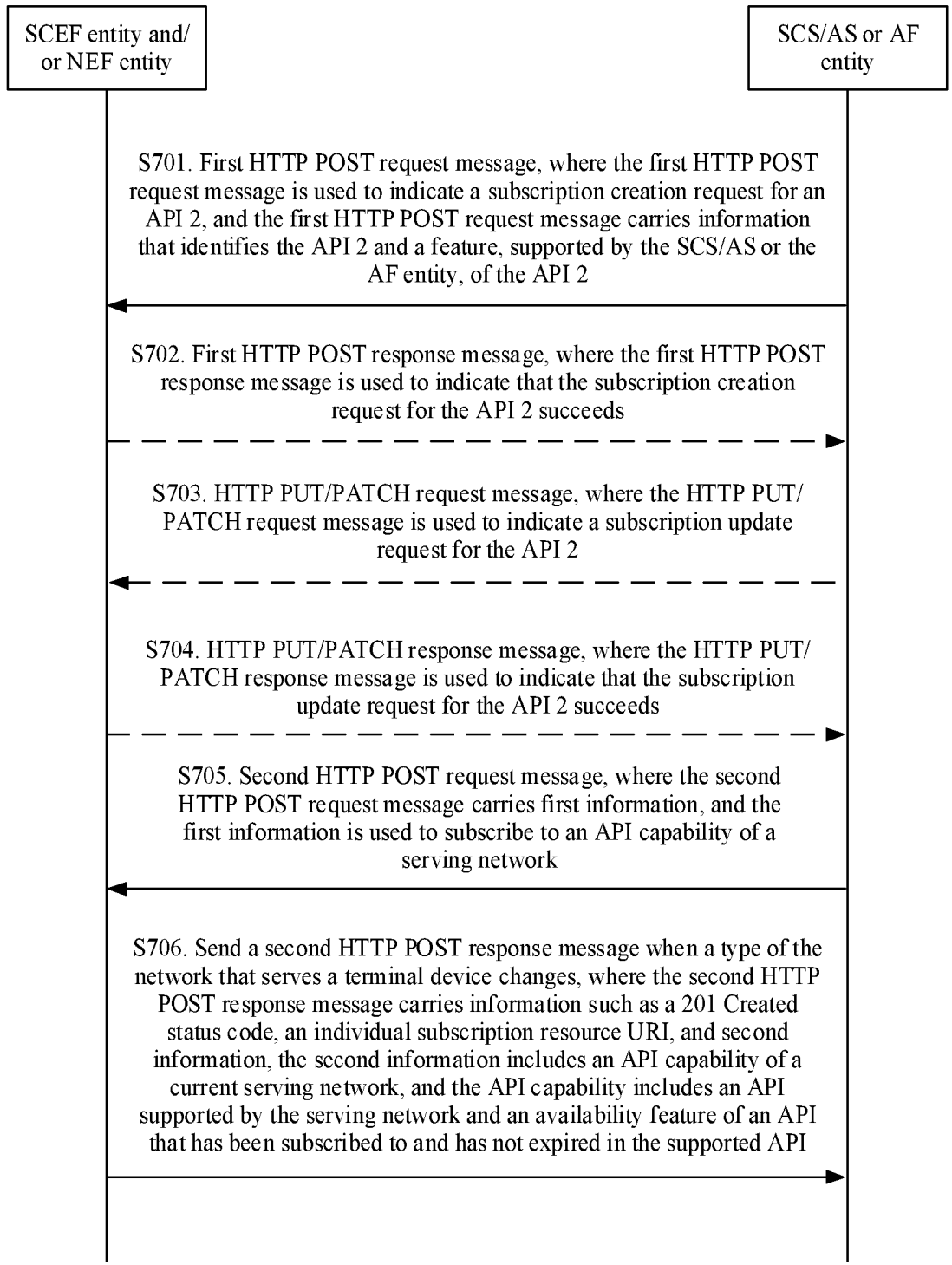
FIG. 8 is a signaling exchanging diagram of a network API capability reporting method according to an embodiment of this application.

FIG. 8 is a signaling exchanging diagram of a network API capability reporting method according to an embodiment of this application. As shown in FIG. 8, the network API capability reporting method in this application may include the following steps.

S701. An SCS/AS or an AF entity sends a first HTTP POST request message to an SCEF entity and/or an NEF entity, where the first HTTP POST request message is used to indicate a subscription creation request for an API 1, and the first HTTP POST request message carries information that identifies the API 2 and a feature, supported by the SCS/AS or the AF entity, of the API 2.

It should be noted that when the API 2 does not have a feature supported by the SCS/AS or the AF entity, the first HTTP POST request message carries information that identifies the API 2. In addition, the first HTTP POST request message may further carry information such as an identifier of a terminal device.

S702. The SCEF entity and/or the NEF entity send/sends a first HTTP POST response message to the SCS/AS or the AF entity, where the first HTTP POST response message is used to indicate that the subscription creation request for the API 2 succeeds.

S702 is an optional step.

S703. The SCS/AS or the AF entity sends an HTTP PUT/PATCH request message to the SCEF entity and/or the NEF entity, where the HTTP PUT/PATCH request message is used to indicate a subscription update request for the API 2.

S703 is an optional step.

S704. The SCS/AS or the AF entity sends an HTTP PUT/PATCH response message to the SCEF entity and/or the NEF entity, where the HTTP PUT/PATCH response message is used to indicate that the subscription update request for the API 2 succeeds.

S704 is an optional step.

S705. The SCS/AS or the AF entity sends a second HTTP POST request message to the SCEF entity and/or the NEF entity, where the second HTTP POST request message carries first information, and the first information is used to subscribe to an API capability of a serving network.

S706. When a type of the serving network changes, the SCEF entity and/or the NEF entity send/sends a second HTTP POST response message to the SCS/AS or the AF entity, where the second HTTP POST response message carries information such as a 201 Created status code, an individual subscription resource URI, and second information, the second information includes an API capability of a current serving network, and the API capability includes an API supported by the serving network and an availability feature of an API that has been subscribed to and has not expired in the supported API.

An implementation of S706 is similar to the implementation of S607 in the embodiment in FIG. 8. Details are not described herein again in this application.

Embodiment 5

Different from Embodiment 1, in Embodiment 5, a second entity needs to learn of a capability of an API 3 to meet a service requirement. Based on the foregoing scenario, with reference to FIG. 9, an implementation of the network API capability reporting method in this application is described using an example.

Figure 9:
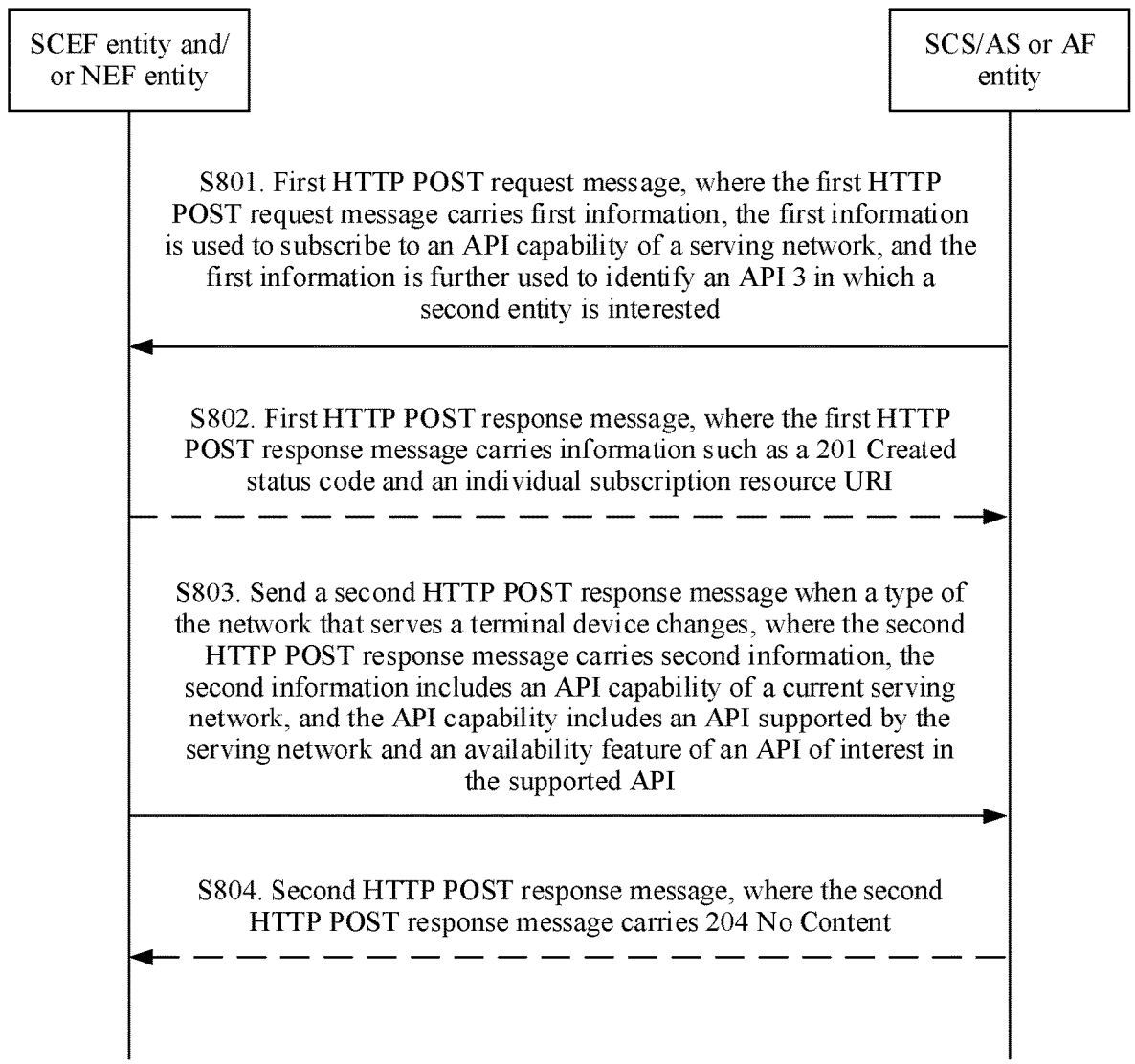
FIG. 9 is a signaling exchanging diagram of a network API capability reporting method according to an embodiment of this application.

FIG. 9 is a signaling exchanging diagram of a network API capability reporting method according to an embodiment of this application. As shown in FIG. 9, the network API capability reporting method in this application may include the following steps.

S801. An SCS/AS or an AF entity sends a first HTTP POST request message to an SCEF entity and/or an NEF entity, where the first HTTP POST request message carries first information, the first information is used to subscribe to an API capability of a serving network, and the first information is further used to identify an API 3 in which a second entity is interested.

S802. The SCEF entity and/or the NEF entity send/sends a first HTTP POST response message to the SCS/AS or the AF entity, where the first HTTP POST response message carries information such as a 201 Created status code and an individual subscription resource URI.

S802 is an optional step.

S803. When a type of the serving network changes, the SCEF entity and/or the NEF entity send/sends a second HTTP POST response message to the SCS/AS or the AF entity, where the second HTTP POST response message carries second information, where the second information includes an API capability of a current serving network, and where the API capability includes an API supported by the serving network and an availability feature of an API of interest in the supported API.

In this application, when the type of the serving network changes from a 5G network to a 4G network, the second information may include an API 1, an API 2, an API 3, and an availability feature of the API 3. When the type of the serving network changes from the 4G network to the 5G network, the second information may include the API 2, the API 3, an API 4, and the availability feature of the API 3.

S804. The SCS/AS or the AF entity sends a second HTTP POST response message to the SCEF entity and/or the NEF entity, where the second HTTP POST response message carries 204 No Content.

S804 is an optional step.

Embodiment 6

Different from Embodiment 5, in Embodiment 6, after a second entity sends first information to a first entity, the first entity may notify the second entity that an API capability of a network is successfully subscribed to or requested. In addition, if a type of a current serving network changes, the second entity may notify the first entity of a success in subscribing to an API capability of a serving network and an API capability of the current serving network. Based on the foregoing scenario, with reference to FIG. 10, an implementation of the network API capability reporting method in this application is described using an example.

Figure 10:
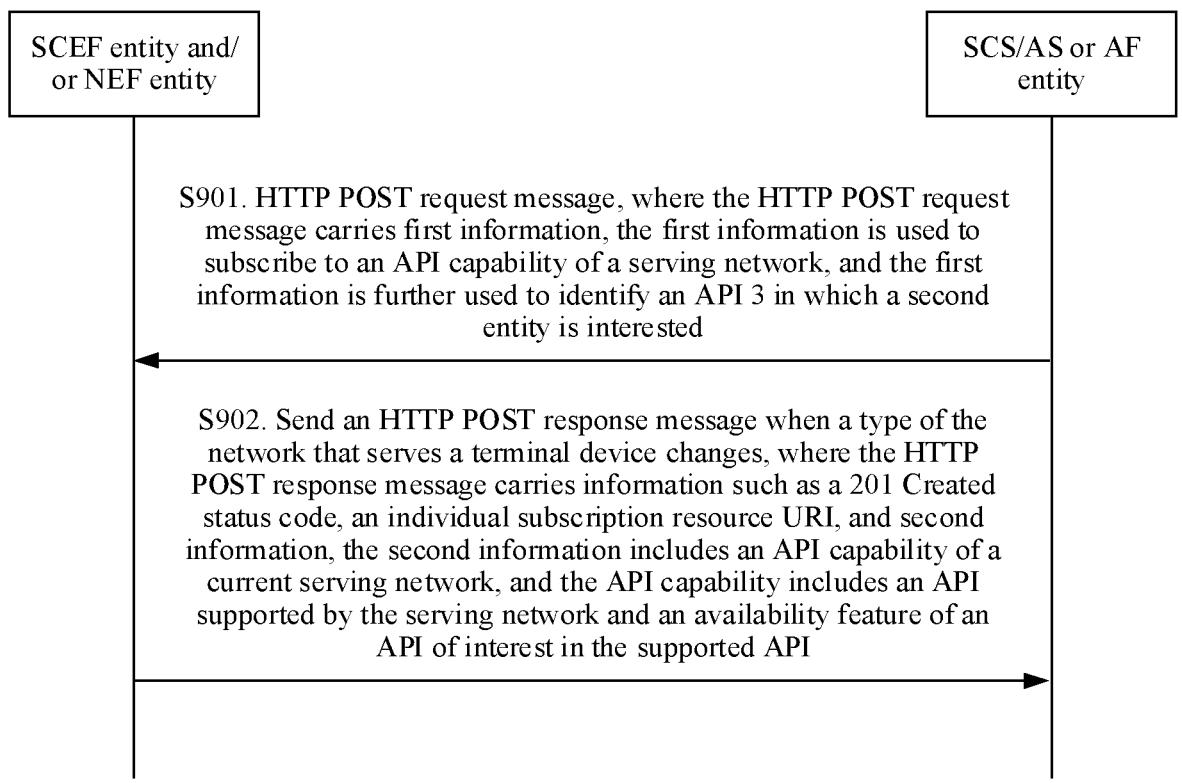
FIG. 10 is a signaling exchanging diagram of a network API capability reporting method according to an embodiment of this application.

FIG. 10 is a signaling exchanging diagram of a network API capability reporting method according to an embodiment of this application. As shown in FIG. 10, the network API capability reporting method in this application may include the following steps.

S901. An SCS/AS or an AF entity sends an HTTP POST request message to an SCEF entity and/or an NEF entity, where the HTTP POST request message carries first information, the first information is used to subscribe to an API capability of a serving network, and the first information is further used to identify an API 3 in which a second entity is interested.

S902. When a type of the serving network changes, the SCEF entity and/or the NEF entity send/sends an HTTP POST response message to the SCS/AS or the AF entity, where the HTTP POST response message carries information such as a 201 Created status code, an individual subscription resource URI, and second information, the second information includes an API capability of a current serving network, and the API capability includes an API supported by the serving network and an availability feature of an API of interest in the supported API.

An implementation of S902 is similar to the implementation of S803 in the embodiment in FIG. 9. Details are not described herein again in this application.

Embodiment 7

Different from Embodiment 1, in Embodiment 7, a second entity has subscribed to an API 2 from a first entity, and the second entity needs to learn of a capability of an API 3 to meet a service requirement. Based on the foregoing scenario, with reference to FIG. 11, an implementation of the network API capability reporting method in this application is described using an example.

Figure 11:
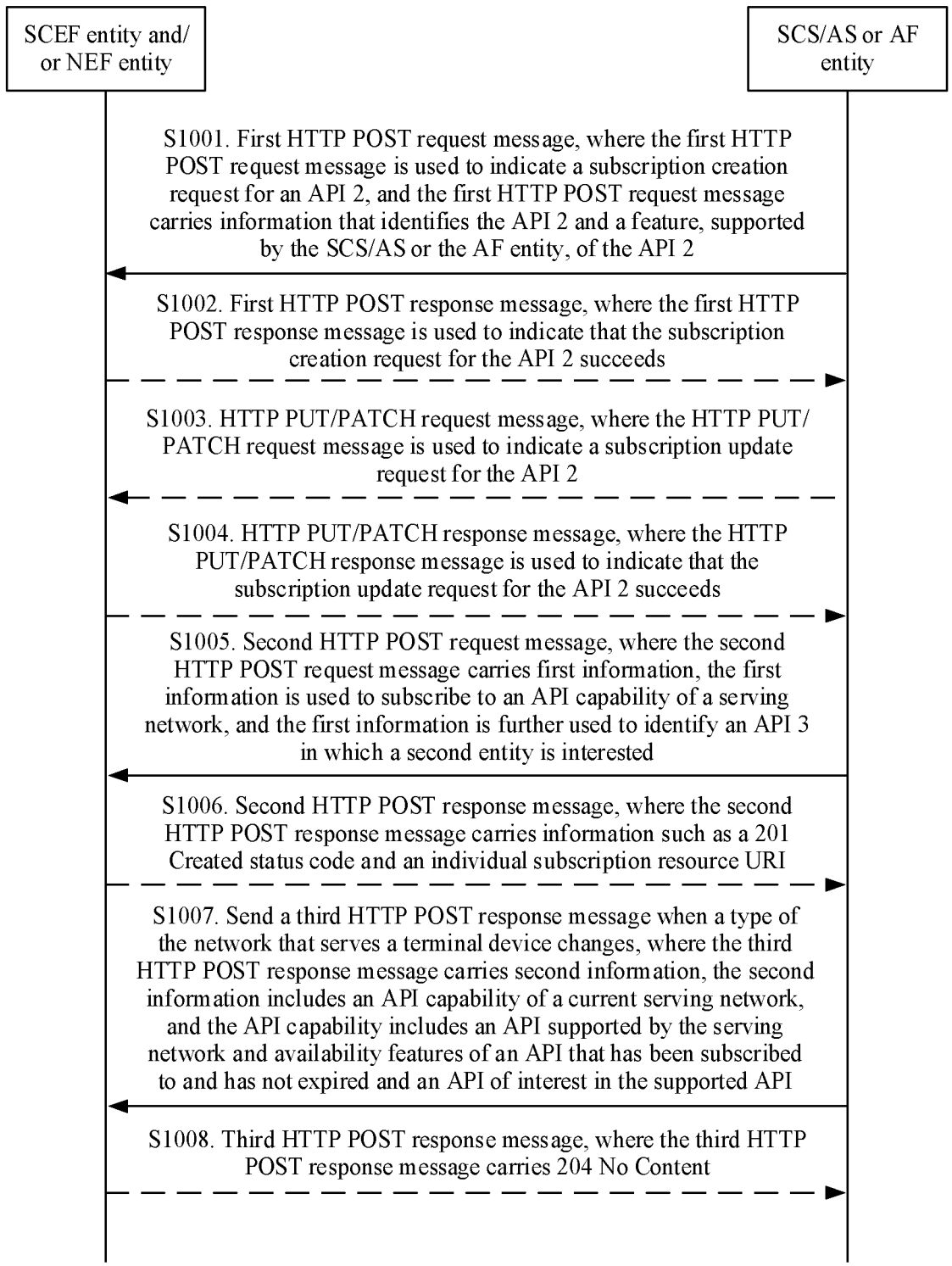
FIG. 11 is a signaling exchanging diagram of a network API capability reporting method according to an embodiment of this application.

FIG. 11 is a signaling exchanging diagram of a network API capability reporting method according to an embodiment of this application. As shown in FIG. 11, the network API capability reporting method in this application may include the following steps.

S1001. An SCS/AS or an AF entity sends a first HTTP POST request message to an SCEF entity and/or an NEF entity, where the first HTTP POST request message is used to indicate a subscription creation request for an API 2, and the first HTTP POST request message carries information that identifies the API 2 and a feature, supported by the SCS/AS or the AF entity, of the API 2.

It should be noted that when the API 2 does not have a feature supported by the SCS/AS or the AF entity, the first HTTP POST request message carries information that identifies the API 2. In addition, the first HTTP POST request message may further carry information such as an identifier of a terminal device.

S1002. The SCEF entity and/or the NEF entity send/sends a first HTTP POST response message to the SCS/AS or the AF entity, where the first HTTP POST response message is used to indicate that the subscription creation request for the API 2 succeeds.

S1002 is an optional step.

S1003. The SCS/AS or the AF entity sends an HTTP PUT/PATCH request message to the SCEF entity and/or the NEF entity, where the HTTP PUT/PATCH request message is used to indicate a subscription update request for the API 2.

S1003 is an optional step.

S1004. The SCS/AS or the AF entity sends an HTTP PUT/PATCH response message to the SCEF entity and/or the NEF entity, where the HTTP PUT/PATCH response message is used to indicate that the subscription update request for the API 2 succeeds.

S1004 is an optional step.

S1005. The SCS/AS or the AF entity sends a second HTTP POST request message to the SCEF entity and/or the NEF entity, where the second HTTP POST request message carries first information, the first information is used to subscribe to an API capability of a serving network, and the first information is further used to identify an API 3 in which a second entity is interested.

S1006. The SCEF entity and/or the NEF entity send/sends a second HTTP POST response message to the SCS/AS or the AF entity, where the second HTTP POST response message carries information such as a 201 Created status code and an individual subscription resource URI.

S1006 is an optional step.

S1007. When a type of the serving network changes, the SCEF entity and/or the NEF entity sends a third HTTP POST response message to the SCS/AS or the AF entity, where the third HTTP POST response message carries second information, the second information includes an API capability of a current serving network, and the API capability includes an API supported by the serving network and availability features of an API that has been subscribed to and has not expired and an API of interest in the supported API.

In this application, when the type of the serving network changes from a 5G network to a 4G network, the second information may include an API 1, an API 2, an API 3, an availability feature of the API 2, and an availability feature of the API 3. When the type of the serving network changes from the 4G network to the 5G network, the second information may include the API 2, the API 3, an API 4, the availability feature of the API 2, and the availability feature of the API 3.

S1008. The SCS/AS or the AF entity sends a third HTTP POST response message to the SCEF entity and/or the NEF entity, where the third HTTP POST response message carries 204 No Content.

S1008 is an optional step.

Embodiment 8

Different from Embodiment 7, in Embodiment 8, after a second entity sends first information to a first entity, the first entity may notify the second entity that an API capability of a network is successfully subscribed to or requested. In addition, if a type of a current serving network changes, the second entity may notify the first entity of a success in subscribing to an API capability of a serving network and an API capability of the current serving network. Based on the foregoing scenario, with reference to FIG. 12, an implementation of the network API capability reporting method in this application is described using an example.

Figure 12:
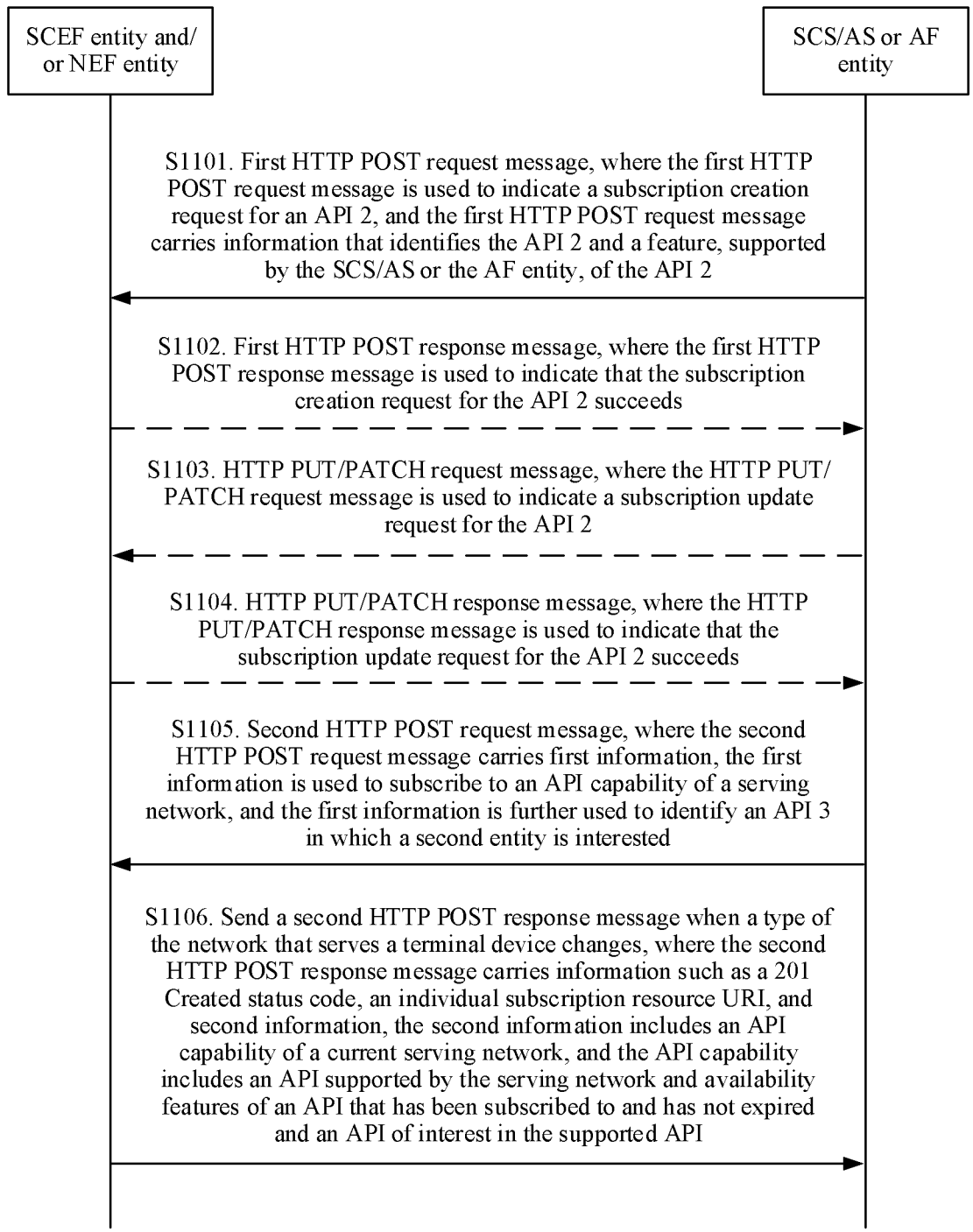
FIG. 12 is a signaling exchanging diagram of a network API capability reporting method according to an embodiment of this application.

FIG. 12 is a signaling exchanging diagram of a network API capability reporting method according to an embodiment of this application. As shown in FIG. 12, the network API capability reporting method in this application may include the following steps.

S1101. An SCS/AS or an AF entity sends a first HTTP POST request message to an SCEF entity and/or an NEF entity, where the first HTTP POST request message is used to indicate a subscription creation request for an API 2, and the first HTTP POST request message carries information that identifies the API 2 and a feature, supported by the SCS/AS or the AF entity, of the API 2.

It should be noted that when the API 2 does not have a feature supported by the SCS/AS or the AF entity, the first HTTP POST request message carries information that identifies the API 2. In addition, the first HTTP POST request message may further carry information such as an identifier of a terminal device.

S1102. The SCEF entity and/or the NEF entity send/sends a first HTTP POST response message to the SCS/AS or the AF entity, where the first HTTP POST response message is used to indicate that the subscription creation request for the API 2 succeeds.

S1102 is an optional step.

S1103. The SCS/AS or the AF entity sends an HTTP PUT/PATCH request message to the SCEF entity and/or the NEF entity, where the HTTP PUT/PATCH request message is used to indicate a subscription update request for the API 2.

S1103 is an optional step.

S1104. The SCS/AS or the AF entity sends an HTTP PUT/PATCH response message to the SCEF entity and/or the NEF entity, where the HTTP PUT/PATCH response message is used to indicate that the subscription update request for the API 2 succeeds.

S1104 is an optional step.

S1105. The SCS/AS or the AF entity sends a second HTTP POST request message to the SCEF entity and/or the NEF entity, where the second HTTP POST request message carries first information, the first information is used to subscribe to an API capability of a serving network, and the first information is further used to identify an API 3 in which a second entity is interested.

S1106. When a type of the serving network changes, the SCEF entity and/or the NEF entity send/sends a second HTTP POST response message to the SCS/AS or the AF entity, where the second HTTP POST response message carries information such as a 201 Created status code, an individual subscription resource URI, and second information, the second information includes an API capability of a current serving network, and the API capability includes an API supported by the serving network and availability features of an API that has been subscribed to and has not expired and an API of interest in the supported API.

An implementation of S1106 is similar to the implementation of S1007 in the embodiment in FIG. 11. Details are not described herein again in this application.

Figure 13:
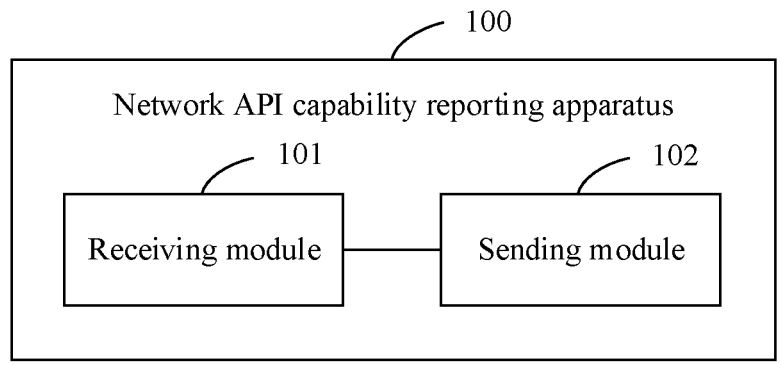
FIG. 13 is a schematic diagram of a structure of a network API capability reporting apparatus according to an embodiment of this application.

For example, this application further provides a network API capability reporting apparatus. FIG. 13 is a schematic diagram of a structure of a network API capability reporting apparatus according to an embodiment of this application. As shown in FIG. 13, the network API capability reporting apparatus 100 used as application support of the SCEF entity and/or the NEF entity in FIG. 1 may provide an API corresponding to an Nnef_APISupportCapability service for a second entity, and is configured to implement an operation corresponding to the first entity in any one of the foregoing method embodiments, such that the second entity can learn of an API capability of a network that serves a terminal device, where the second entity may include the SCS/AS, the AF entity, or another function entity in FIG. 1.

The network API capability reporting apparatus in this application may include a receiving module 101 and a sending module 102. The receiving module 101 is configured to receive first information, where the first information is used to subscribe to the API capability of the network that serves the terminal device. The sending module 102 is configured to send second information to the second entity when a type of the network that serves the terminal device changes, where the second information includes an API capability of a network that currently serves the terminal device, and the API capability includes an API supported by the network that serves the terminal device and an availability feature of at least one API in the supported API.

In some embodiments, the network API capability reporting apparatus is used in the first entity, where the first entity includes an SCEF entity and/or an NEF entity, and the second entity includes an SCS/AS, an AF entity, or another function entity.

In some embodiments, the receiving module 101 is configured to receive the first information from the second entity, where the second entity is an SCS/AS or an AF entity.

In some embodiments, the receiving module 101 is configured to receive the first information from a third entity, where the third entity is an SCS/AS or an AF entity, and the third entity is different from the second entity.

In some embodiments, the availability feature of the at least one API is an availability feature of an API that has been subscribed to and has not expired.

In some embodiments, the availability feature of the at least one API is an availability feature of an API of interest.

In some embodiments, the availability feature of the at least one API includes an availability feature of an API that has been subscribed to and has not expired and an availability feature of an API of interest.

The network API capability reporting apparatus in this embodiment of this application may be configured to perform the technical solutions in the foregoing method embodiments. An implementation principle and a technical effect thereof are similar, and details are not described herein again.

Figure 14:
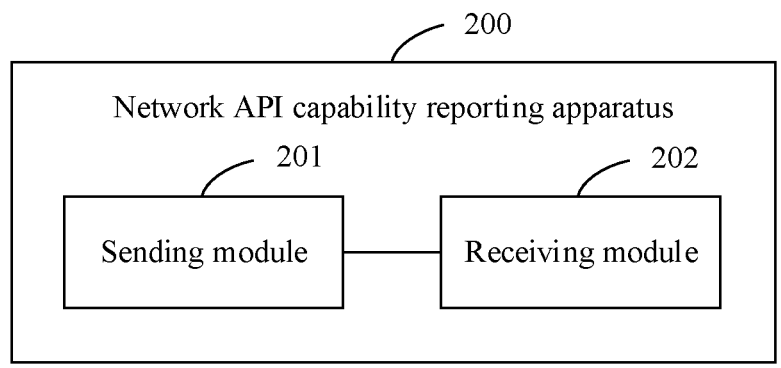
FIG. 14 is a schematic diagram of a structure of a network API capability reporting apparatus according to an embodiment of this application.

For example, this application further provides a network API capability reporting apparatus. FIG. 14 is a schematic diagram of a structure of a network API capability reporting apparatus according to an embodiment of this application. As shown in FIG. 14, the network API capability reporting apparatus 200, used as application support of the SCS/AS, the AF entity, or another function entity in FIG. 1, may be configured to implement, using an API corresponding to an Nnef_APISupportCapability service provided by a first entity, an operation corresponding to the second entity in any one of the foregoing method embodiments, such that the second entity can learn of an API capability of a network that serves a terminal device from the first entity, where the first entity may include the SCEF entity and/or the NEF entity in FIG. 1.

The network API capability reporting apparatus 200 in this application may include a sending module 201 and a receiving module 202. The sending module 201 is configured to send first information to the first entity, where the first information is used to subscribe to the API capability of the network that serves the terminal device. The receiving module 202 is configured to receive second information from the first entity when a type of the network that serves the terminal device changes, where the second information includes an API capability of a network that currently serves the terminal device, and where the API capability includes an API supported by the network that serves the terminal device and an availability feature of at least one API in the supported API.

In some embodiments, the first entity includes an SCEF entity and/or an NEF entity. The network API capability reporting apparatus is used in a second entity, and the second entity includes an SCS/AS or an AF entity.

In some embodiments, the availability feature of the at least one API is an availability feature of an API that has been subscribed to and has not expired.

In some embodiments, the availability feature of the at least one API is an availability feature of an API of interest.

In some embodiments, the availability feature of the at least one API includes an availability feature of an API that has been subscribed to and has not expired and an availability feature of an API of interest.

The network API capability reporting apparatus in this embodiment of this application may be configured to perform the technical solutions in the foregoing method embodiments. An implementation principle and a technical effect thereof are similar, and details are not described herein again.

For example, this application further provides a network API capability reporting system. The network API capability reporting system includes a first entity and a second entity. For the first entity, refer to the SCEF entity and/or the NEF entity shown in FIG. 1. The first entity may provide the second entity with an API corresponding to an Nnef_APISupportCapability service, to implement an operation corresponding to the first entity in any one of the foregoing method embodiments. For the second entity, refer to the SCS/AS, the AF entity, or another function entity shown in FIG. 1. The second entity is configured to implement an operation corresponding to the second entity in any one of the foregoing method embodiments, such that the second entity can learn of an API capability of a network that serves a terminal device from the first entity.

Figure 15:
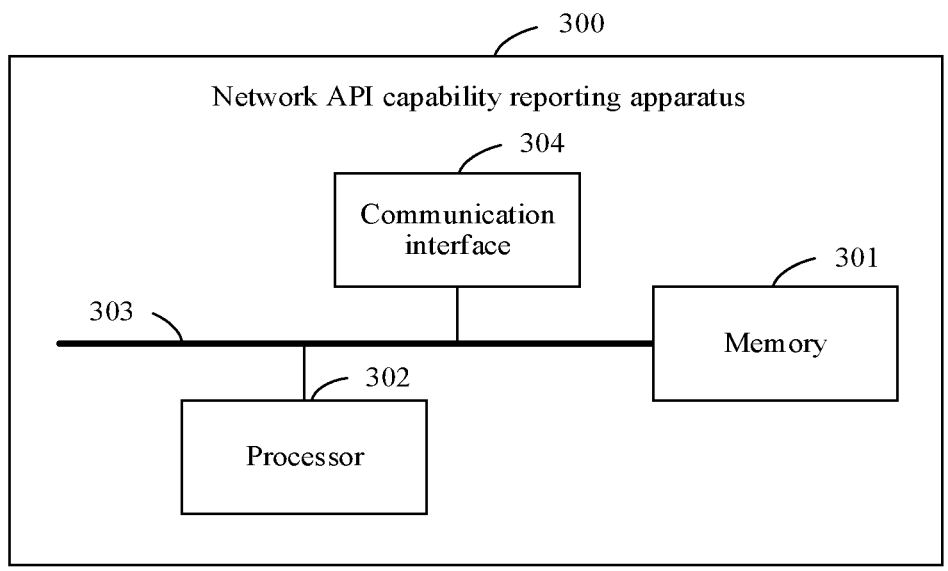
FIG. 15 is a schematic diagram of a hardware structure of a network API capability reporting apparatus according to an embodiment of this application.

For example, this application further provides a network API capability reporting apparatus. FIG. 15 is a schematic diagram of a hardware structure of a network API capability reporting apparatus 300 according to an embodiment of this application. As shown in FIG. 15, the network API capability reporting apparatus 300 used as hardware support of the SCEF entity and/or the NEF entity in FIG. 1 may provide an API corresponding to an Nnef_APISupportCapability service for a second entity, and is configured to implement an operation corresponding to the first entity in any one of the foregoing method embodiments, such that the second entity can learn of an API capability of a network that serves a terminal device, where the second entity may include the SCS/AS, the AF entity, or another function entity in FIG. 1.

The API capability reporting apparatus 300 in this application may include a memory 301 and a processor 302. The memory 301 may be connected to the processor 302 through a bus 303.

The memory 301 is configured to store program code.

The processor 302 is configured to invoke the program code; and when the program code is executed, the network API capability reporting method in any one of the foregoing embodiments is performed. For details, refer to related descriptions in the foregoing method embodiments.

Optionally, the API capability reporting apparatus 300 in this application further includes a communication interface 304. The communication interface 304 may be connected to the processor 302 through the bus 303. The processor 302 may control the communication interface 303 to implement the foregoing receiving and sending functions of the API capability reporting apparatus 300.

The API capability reporting apparatus in this embodiment of this application may be configured to perform the technical solutions in the foregoing method embodiments. An implementation principle and a technical effect thereof are similar, and details are not described herein again.

Figure 16:
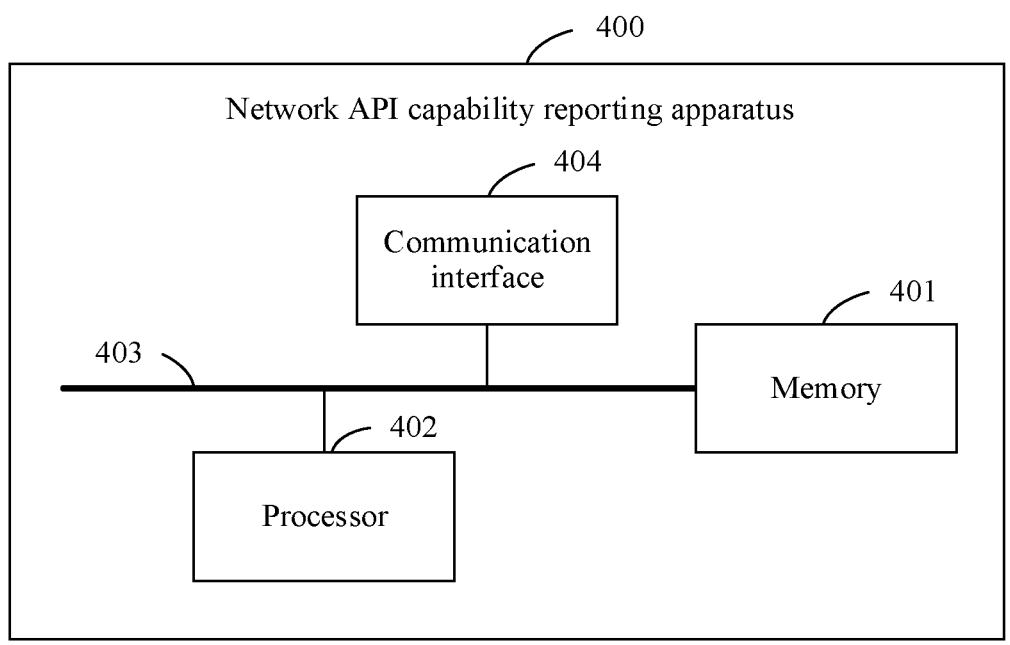
FIG. 16 is a schematic diagram of a hardware structure of a network API capability reporting apparatus according to an embodiment of this application.

For example, this application further provides an API capability reporting apparatus. FIG. 16 is a schematic diagram of a hardware structure of an API capability reporting apparatus 400 according to an embodiment of this application. As shown in FIG. 16, the API capability reporting apparatus 400, used as hardware support of the SCS/AS, the AF entity, or another function entity in FIG. 1, may be configured to implement, using an API corresponding to an Nnef_APISupportCapability service provided by a first entity, an operation corresponding to the second entity in any one of the foregoing method embodiments, such that the second entity can learn of an API capability of a network that serves a terminal device from the first entity, where the first entity may include the SCEF entity and/or the NEF entity in FIG. 1.

The API capability reporting apparatus 400 in this application may include a memory 401 and a processor 402. The memory 401 may be connected to the processor 402 through a bus 403.

The memory 401 is configured to store program code.

The processor 402 is configured to invoke the program code; and when the program code is executed, the network API capability reporting method in any one of the foregoing embodiments is performed. For details, refer to related descriptions in the foregoing method embodiments.

Optionally, the API capability reporting apparatus 400 in this application includes a communication interface 404. The communication interface 404 may be connected to the processor 402 through the bus 403. The processor 402 may control the communication interface 403 to implement the foregoing receiving and sending functions of the API capability reporting apparatus 400.

The API capability reporting apparatus in this embodiment of this application may be configured to perform the technical solutions in the foregoing method embodiments. An implementation principle and a technical effect thereof are similar, and details are not described herein again.

This application further provides a readable storage medium. The readable storage medium stores executable instructions. When at least one processor of an API capability reporting apparatus executes the executable instructions, the API capability reporting apparatus performs the network API capability reporting method in the foregoing method embodiments.

This application further provides a chip. The chip is connected to a memory, or the chip is integrated with the memory. When a software program stored in the memory is executed, the network API capability reporting method in the foregoing method embodiments is implemented.

This application further provides a program product, where the program product includes executable instructions, and the executable instructions are stored in a readable storage medium. At least one processor of an API capability reporting apparatus may read the executable instructions from the readable storage medium, and the at least one processor executes the executable instructions, to enable the API capability reporting apparatus to implement the network API capability reporting method in the foregoing method embodiments.

In the several embodiments provided in this application, it should be understood that the disclosed device and method may be implemented in other manners. For example, the described device embodiment is merely an example. For example, division into modules is merely logical function division. During actual implementation, there may be another division manner. For example, a plurality of modules may be combined or integrated into another system, or some features may be ignored or not performed. In addition, the displayed or discussed mutual couplings or direct couplings or communication connections may be implemented through some interfaces, and indirect couplings or communication connections between apparatuses or modules may be implemented in electronic, mechanical, or other forms.

The modules described as separate components may or may not be physically separated, and components displayed as modules may or may not be physical units, may be located in one position, or may be distributed on a plurality of network units. Some or all of the modules may be selected based on an actual requirement to implement the objectives of the solutions in the embodiments of this application.

In addition, function modules in the embodiments of this application may be integrated into one processing unit, or each of the modules may exist alone physically, or two or more modules are integrated into one unit. The integrated unit may be implemented in a form of hardware, or may be implemented in a form of the hardware and a software function unit.

The foregoing integrated module implemented in a form of a software function module may be stored in a computer readable storage medium. The software function module is stored in a storage medium and includes several instructions to enable a computer device (which may be a personal computer, a server, or a network device) or a processor to perform some steps of the methods in the embodiments of this application.

It should be understood that the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor. The steps of the method disclosed with reference to the present disclosure may be directly performed by a hardware processor, or may be performed using a combination of hardware in the processor and a software module.

The memory may include a high-speed memory such as a random-access memory (RAM), and may further include a nonvolatile memory (NVM), for example, at least one magnetic disk memory, or may be a Universal Serial Bus (USB) flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. Buses may be classified into an address bus, a data bus, a control bus, and the like. For ease of representation, the bus in the accompanying drawings in this application is not limited to only one bus or only one type of bus.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a Digital Video Disc (DVD)), a semiconductor medium (for example, a solid state drive (SSD)), or the like.

What is claimed is:

1. A network application programming interface (API) capability reporting method implemented by a first entity and comprising:
   receiving first information usable for subscribing to an API capability of a network serving a terminal device; and
   sending second information to a second entity when the network changes from a first network of a first type to a second network of a second type,
   wherein the second information comprises a second API capability of the second network,
   wherein the second API capability indicates an API supported by the second network and at least one feature that is of the API and that is capable of being used in the second network,
   wherein the second API capability indicating the API and the at least one feature comprises the second API capability indicating all APIs supported by the second network and all features that are of all the APIs supported by the second network and that are capable of being used in the second network.

2. The network API capability reporting method according to claim 1, wherein the first entity comprises at least one of a service capability exposure function entity or a network exposure function entity, and wherein the second entity comprises at least one of a service capability server/application server or an application function entity.

3. The network API capability reporting method according to claim 1, wherein receiving the first information comprises receiving the first information from the second entity, and wherein the second entity is a service capability server/application server or an application function entity.

4. The network API capability reporting method according to claim 1, wherein the at least one feature is of an API that has been subscribed to and has not expired.

5. The network API capability reporting method according to claim 1, wherein the at least one feature is of an API of interest.

6. The network API capability reporting method according to claim 1, wherein the at least one feature comprises a first feature and a second feature, wherein the first feature is of a first API that has been subscribed to and has not expired, and wherein the second feature is of a second API of interest.

7. The network API capability reporting method according to claim 1, further comprising receiving, from a unified data management entity when the network changes from a $4^{th}$ generation (4G) network to a $5^{th}$ generation (5G) network, notification that a type of the network has changed, wherein the first entity is a network exposure entity, and wherein the second entity is an application function entity.

8. The network API capability reporting method according to claim 1, further comprising receiving, from a home subscriber server entity when the network changes from a $5^{th}$ generation (5G) network to a $4^{th}$ generation (4G) network, notification that a type of the network has changed, wherein the first entity is a service capability exposure function entity, and wherein the second entity is an application server.

9. The network API capability reporting method according to claim 1, wherein receiving the first information comprises receiving a Hypertext Transfer Protocol (HTTP) post request message, and wherein the HTTP post request message comprises the first information.

10. The network API capability reporting method according to claim 1, wherein sending the second information comprises sending a Hypertext Transfer Protocol (HTTP) post request message, and wherein the HTTP post request message comprises the second information.

11. An apparatus comprising:
   a memory configured to store program instructions; and
   at least one processor configured to execute the program instructions to cause the apparatus to:
      receive first information usable for subscribing to an application programming interface (API) capability of a network serving a terminal device; and
      send second information to a second entity when the network changes from a first network of a first type to a second network of a second type,
      wherein the second information indicates a second API capability of the second network,
      wherein the second API capability indicates an API supported by the second network and at least one feature that is of the API and that is capable of being used in the second network, and wherein the second API capability indicating the API and the at least one feature comprises the second API capability indicating all APIs supported by the second network and all features that are of all the APIs supported by the second network and that are capable of being used in the second network.

12. The apparatus according to claim 11, wherein the apparatus comprises at least one of a service capability exposure function entity or a network exposure function entity, and wherein the second entity comprises at least one of a service capability server/application server or an application function entity.

13. The apparatus according to claim 11, wherein the at least one processor is further configured to execute the program instructions to cause the apparatus to further receive the first information from the second entity, and wherein the second entity is a service capability server/application server or an application function entity.

14. The apparatus according to claim 11, wherein the at least one feature is of an API that has been subscribed to and has not expired.

15. The apparatus according to claim 11, wherein the at least one feature is of an API of interest.

16. The apparatus according to claim 11, wherein the at least one feature comprises a first feature and a second feature, wherein the first feature is of an API that has been subscribed to and has not expired, and wherein the second feature is of an API of interest.

17. The apparatus according to claim 11, wherein the at least one processor is further configured to execute the program instructions to cause the apparatus to receive, from a unified data management entity when the network changes from a $4^{th}$ generation (4G) network to a $5^{th}$ generation (5G) network, notification that a type of the network has changed, and wherein the apparatus is a network exposure function entity, and wherein the second entity is an application function entity.

18. The apparatus according to claim 11, wherein the at least one processor is further configured to execute the program instructions to cause the apparatus to receive, from a home subscriber server entity when the network changes from a $5^{th}$ generation (5G) network to a $4^{th}$ generation (4G) network, notification that a type of the network has changed, and wherein the apparatus is a service capability exposure function entity, and wherein the second entity is an application server.

19. A non-transitory computer-readable storage medium configured to store instructions, which when executed by at least one processor, cause an apparatus to:

receive first information usable for subscribing to an application programming interface (API) capability of a network serving a terminal device; and send second information to a second entity when the network changes from a first network of a first type to a second network of a second type, wherein the second information comprises a second API capability of the second network, wherein the second API capability indicates an API supported by the second network and at least one feature that is of the API and that is capable of being used in the second network, and wherein the second API capability indicating the API and the at least one feature comprises the second API capability indicating all APIs supported by the second network and all features that are of all the APIs supported by the second network and that are capable of being used in the second network.

20. The non-transitory computer-readable storage medium according to claim 19, wherein the instructions, when executed by the at least one processor, further cause the apparatus to further receive the first information from the second entity, and wherein the second entity is a service capability server/application server or an application function entity.

* * * * *